INVENTOR:
WILLIAM E. BRAY

ATTORNEY

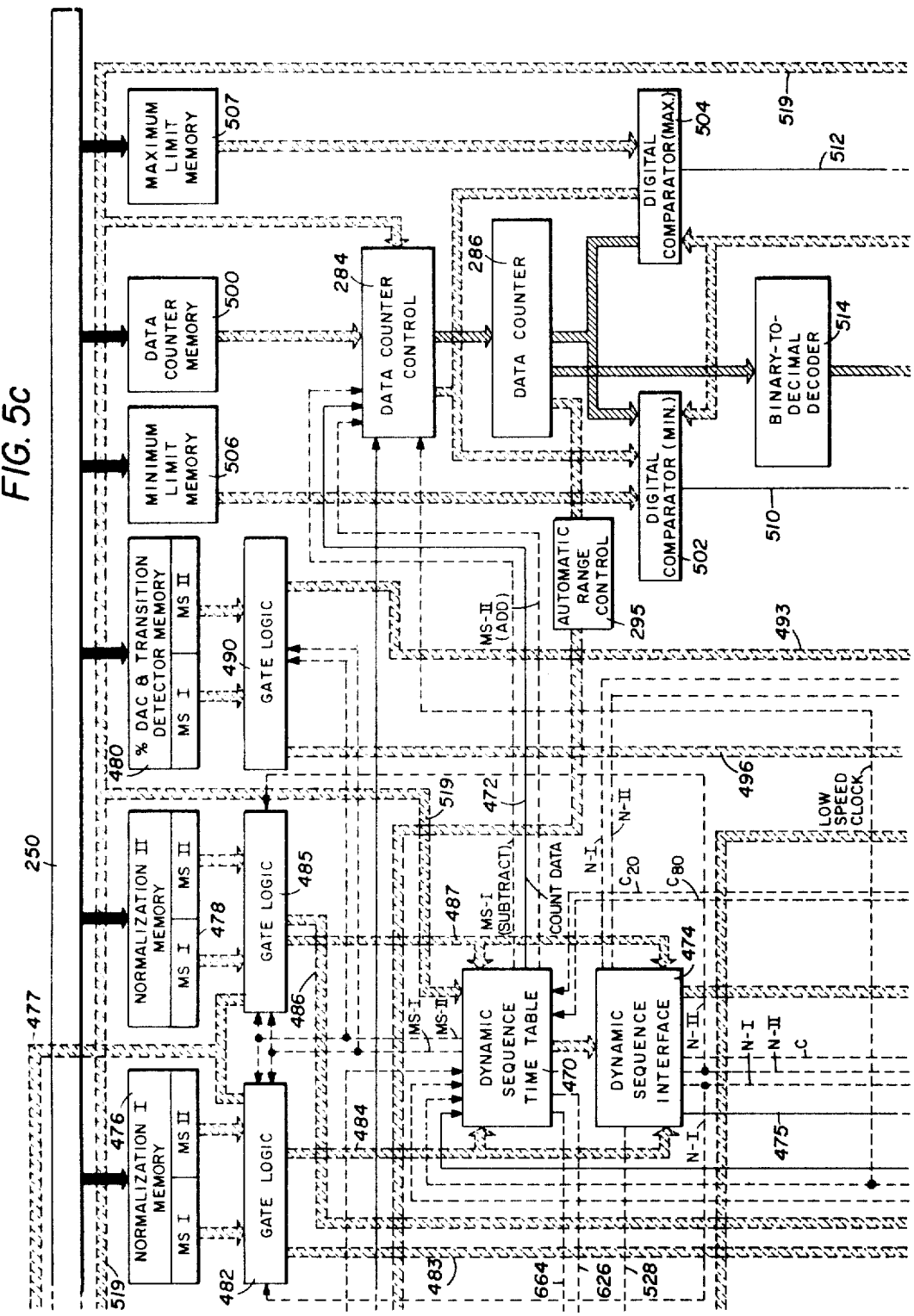

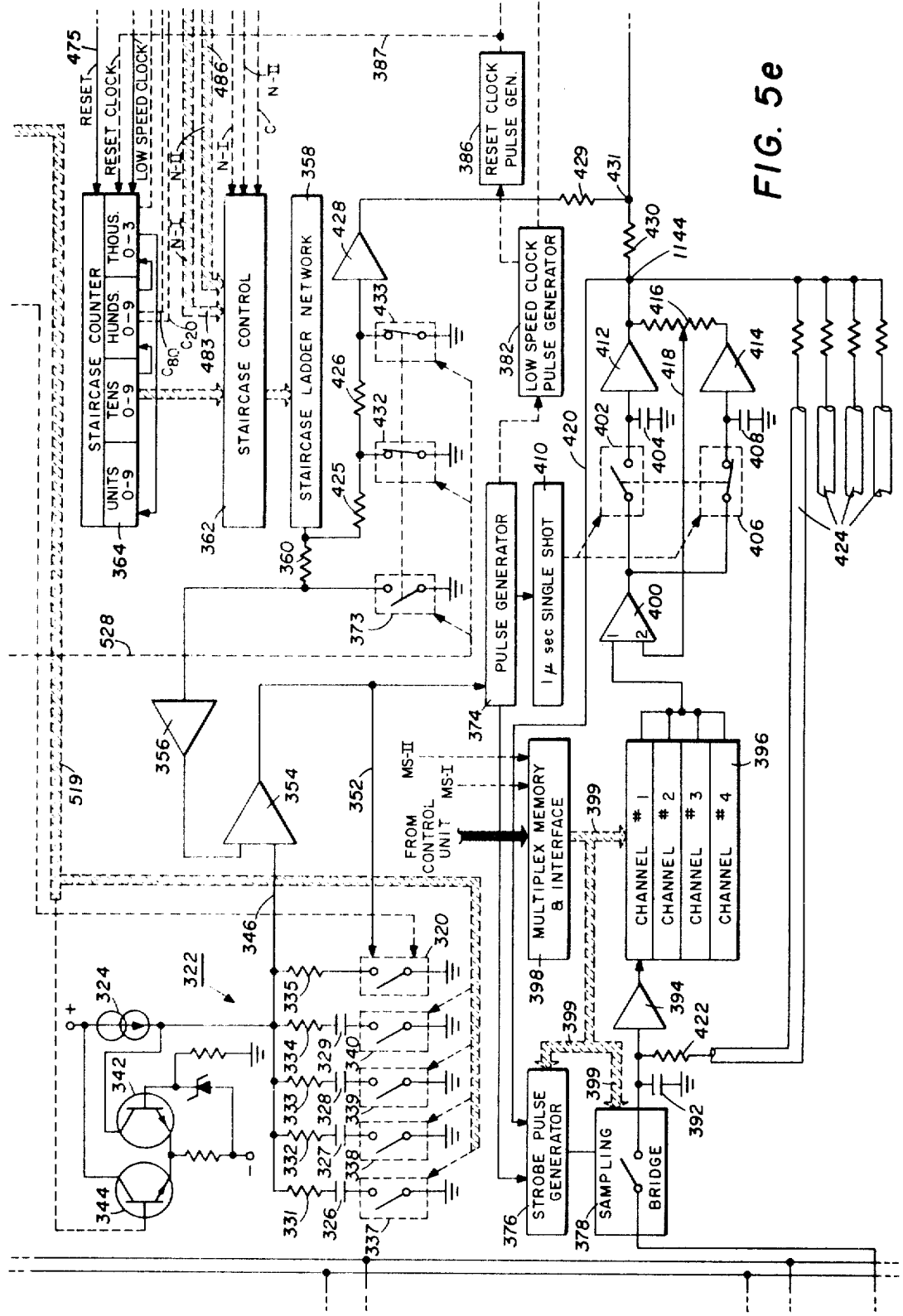

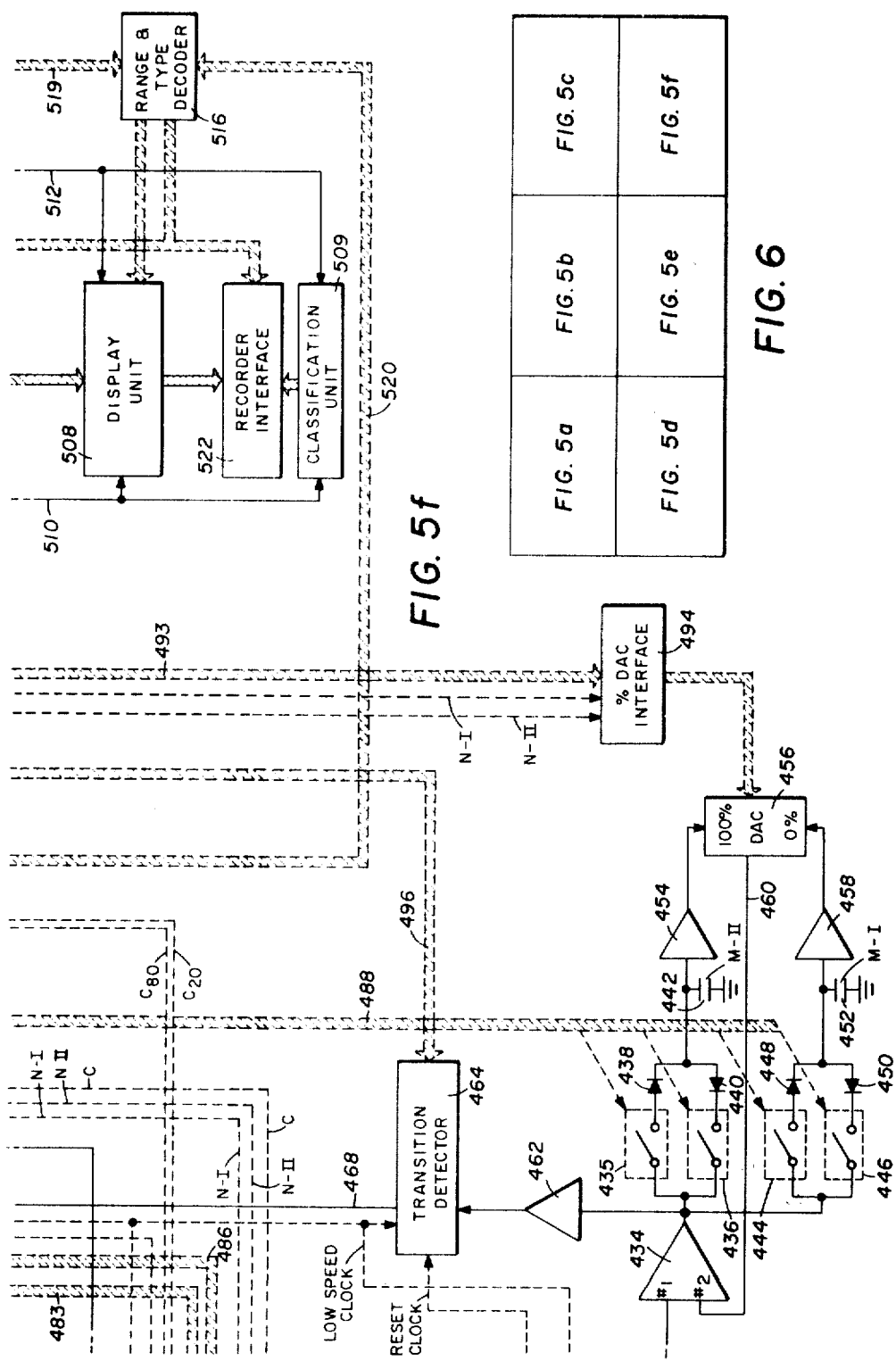

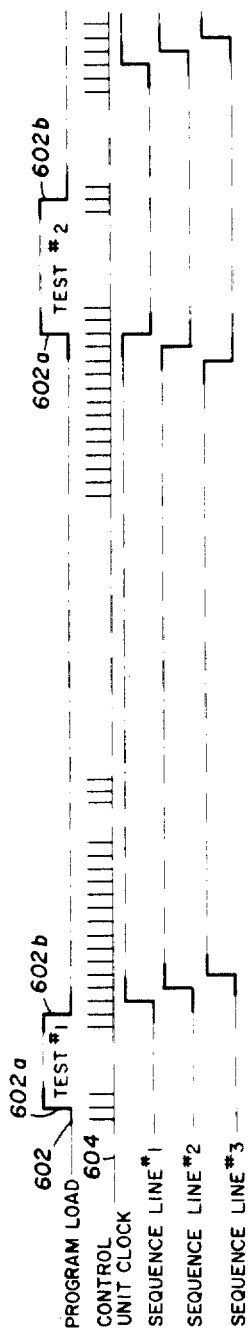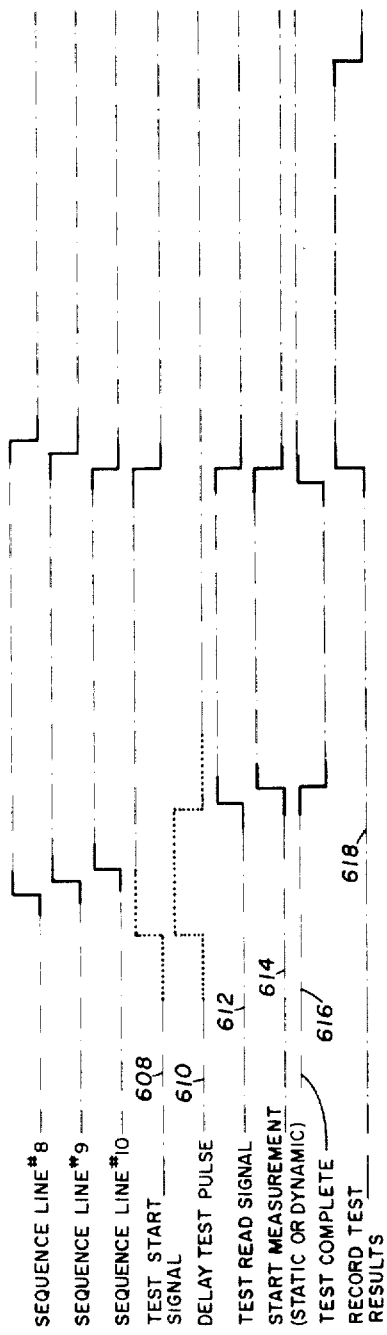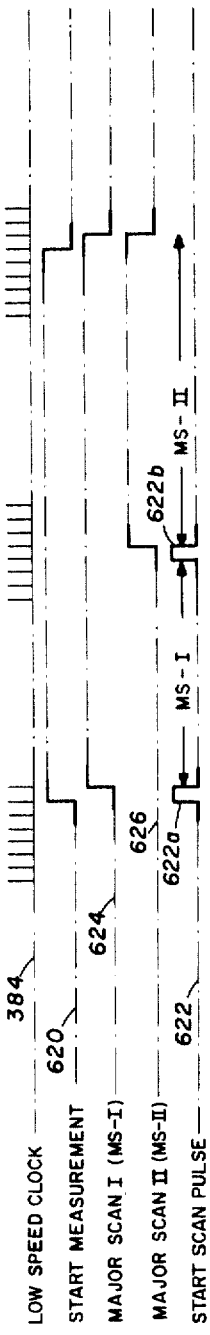
FIG. 8
FIG. 9

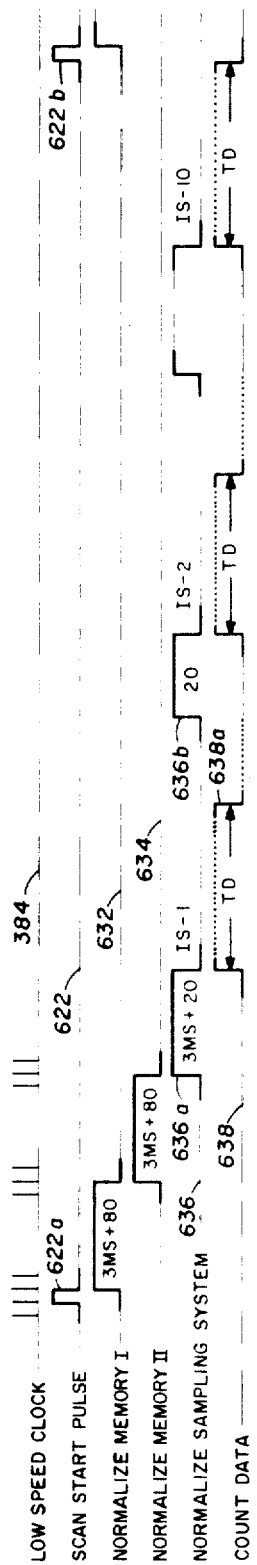
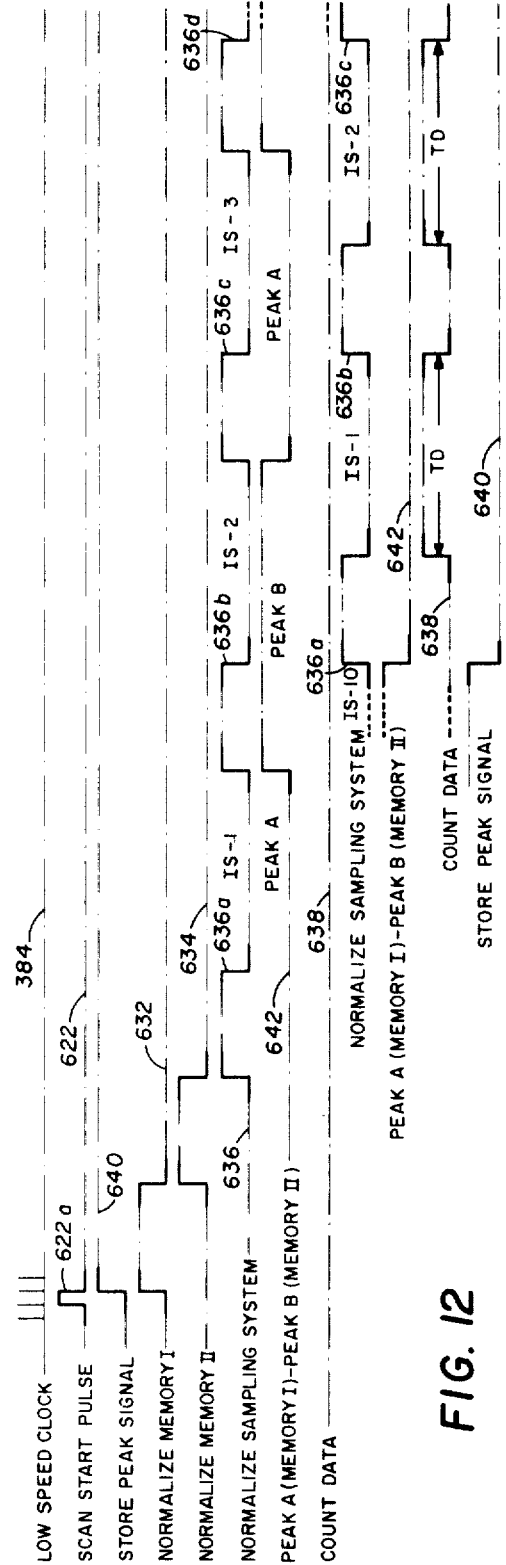
FIG. 11
FIG. 12

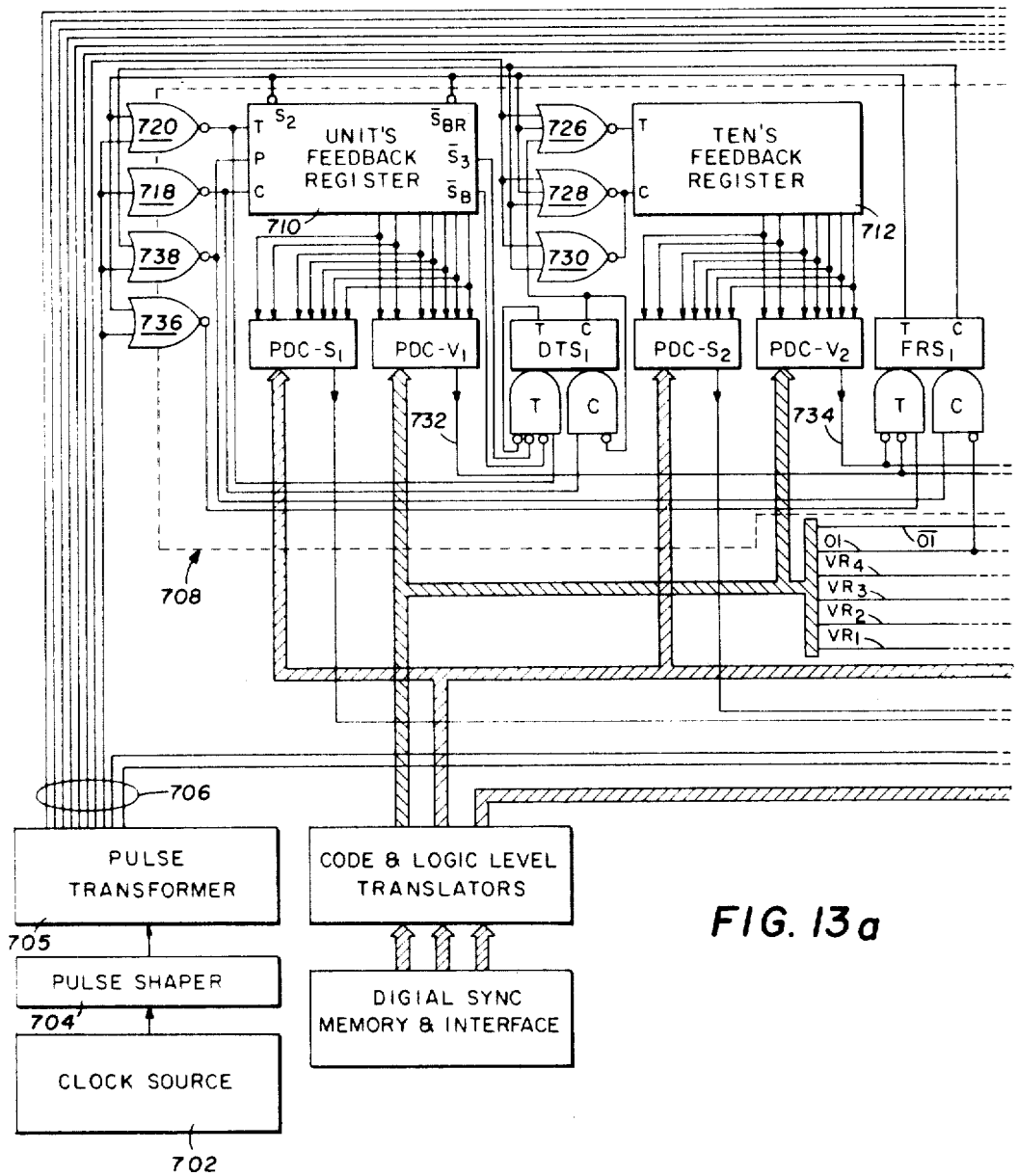
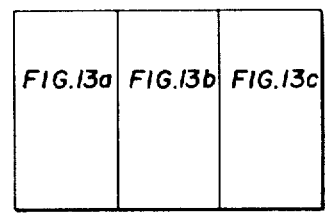
FIG. 13a
FIG. 14

United States Patent Office 3,440,609
Patented Apr. 22, 1969

3,440,609
DIGITAL SYNCHRONIZATION SYSTEM
William E. Bray, Houston, Tex., assignor to Texas Instruments Incorporated, Dallas, Tex., a corporation of Delaware
Filed Dec. 7, 1965, Ser. No. 512,148
Int. Cl. G11b 13/00
U.S. Cl. 340—172.5                                    44 Claims

ABSTRACT OF THE DISCLOSURE

A very high speed digital synchronization system for producing a train of reference clock pulses of uniform minimum time spacing, a series of reset clock pulses defining periods of a predetermined number of reference clock pulses, a series of sample clock pulses occurring once each period in synchronism with substantially any programably selected reference pulse, a series of variable clock pulses occurring at uniform periods at a much higher rate than the sample clock rate and in synchronism with the reference clock pulses, and a series of delayed clock pulses occurring at predetermined periods after each variable clock pulse and in synchronism with a reference clock pulse. The system includes a unique very high speed counter, a unique programable comparator for detecting a selected count of the counter, and a unique pulse transformer for producing a plurality of precisely synchronized clock pulses for driving the complex system.

---

This invention relates generally to synchronization systems, and more particularly relates to a system for producing one or more precisely synchronized pulse trains from a high frequency clock source.

During and after the manufacture of electronic components such as diodes, transistors and integrated circuits, it is common practice for either or both the supplier and the ultimate user to make various tests in order to determine the operability and characteristic parameters of the devices. For example, various parameter tests must be made on discrete semiconductor devices so that the devices can be classified for particular uses in circuits designed by mathematical formulas. On the other hand, the parameter information of each component is virtually unobtainable in integrated circuits where a large number of components are formed "in situ" on a single semiconductor wafer, and even if obtainable, would be of comparatively little value. This necessitates testing the entire integrated network in order to obtain the necessary design parameters and to test the operability of the network.

All tests performed on semiconductor devices can be broken down into two broad categories. The first, generally referred to as "static" testing, involves the application of stimuli and measurement of responses which are completely or essentially D.C. in nature and do not take into consideration either time or frequency ratings of the device under test. The other, referred to as "dynamic" testing, involves the application of both D.C. bias and a pulse stimuli which periodically varies to closely approximate the conditions under which the device will operate and the measurement of the responses from the stimuli. For example, the propagation delays of integrated logic circuits specified for 10 megacycle operation should be measured at a 10 megacycle repetition rate to properly condsider R-L-C time constants and stored charge effects in the active devices.

Both component and integrated circuit testing has heretofore centered primarily around static measurements. Dynamic measurements have been made only in certain preselected areas using specially designed test equipment. Comprehensive testing of integrated circuit devices is greatly complicated in that such devices may have a large number of leads, fourteen to twenty being a very common number based on current technology. Further, a typical integrated circuit may require from twenty-five to fifty separate measurements or tests with each test perhaps being performed using different bias levels, amplitudes, and pulse widths applied to different leads. Because of the large number of tests which must be made on a large number of network devices, the test methods and systems heretofore available made comprehensive testing impractical.

In copending application Ser. No. 482,449, filed Aug. 25, 1965, by John H. Alford et al., entitled Universal Electronic Test System, and continuation-in-part application Ser. No. 512,109, filed Dec. 7, 1965, by John H. Alford et al., entitled Test System for Automatically Making Static and Dynamic Tests on an Electronic Device, a method and apparatus for comprehensive testing of nonlinear logic circuits, parameter testing of discrete components, and certain functional testing of analog circuits is described. The method and apparatus described may be used to test such components and circuits as AND, OR, NAND, NOR, flip-flops, inverters, logic drivers, differential amplifiers, operational amplifiers, linear amplifiers, printed circuit logic cards, logic modules, diodes, transistors, and resistors. These devices may be tested for delay time, rise time, storage time, fall time, propagation delay, propagation difference, average delay, commutating time, feed-through, overshoot, undershoot, period, pulse width, peak amplitude, amplitude, logic levels, noise thresholds, set-reset sensitivity, balance, offset voltage, output level, D.C. gain, step response (band width), leakage, breakdown voltage, reverse recovery, droop, as well as the more conventional static voltage and current measurements.

In the measuring system described in the above-referenced copending applications, the operation of the dynamic measuring subsystem is dependent for accuracy and versatility upon the synchronization system which generates a high frequency variable clock pulse train which is used to initiate the pulses of a repetitive waveform used to stimulate the test specimen, and a sample clock pulse train having a much lower frequency with each pulse positioned in predetermined relationship to the pulses of the variable clock pulse train with great precision. Since it is virtually impossible to design a measuring system for a high frequency waveform, the measuring system utilizes a special sampling subsystem for taking a series of samples from succeeding periods of the repetitive waveform being measured so that a selected portion of each period of the high frequency repetitive waveform is reproduced as a stair step approximation occurring at a much lower frequency. In the sampling subsystem, each of the pulses of the low speed clock pulse train is used to initiate a fast ramp voltage having a programable slope. Each fast ramp is compared with a staircase reference voltage and strobe pulse is produced at the point in time when the ramp voltage exceeds the staircase reference voltage. The staircase reference voltage increments one step after each ramp voltage so that each successive strobe pulse is delayed from the initiating sample clock pulse by a period determined by the slope of the ramp and the height of the step of the staircase reference voltage. This provides a means whereby the very high speed repetitive waveform on which the measurements are to be made can be sampled at very sort time intervals. However, unless the low speed sample clock pulses are precisely oriented in time with respect to the high speed waveform being measured, the accuracy of the sampling system will be materially degraded.

Thus an object of this invention is to provide a synchronization means for a measuring system for making substantially all voltage, current and time measurements necessary to test and classify substantially any electronic device or circuit.

A very important object of this invention is to provide a synchronization system for repetitively identifying a point in time within a repetitive period with great precision.

Another object is to provide a synchronization system wherein one or more pulse trains are derived from a single high frequency reference clock source so that each pulse of each pulse train will be precisely oriented in time.

Another object of the invention is to provide a system for deriving a first high speed clock pulse train and a second clock pulse train of lower frequency precisely synchronized with the first.

Another important object of the invention is to provide such a synchronization system wherein the frequency of a high speed variable clock pulse train may be selected over a wide frequency range, and wherein the frequency of a lower speed sample clock pulse train may also be selected over a wide range and may further be selected to occur at substantially any point in time with respect to the higher speed variable clock pulse train.

Still another object of the invention is to provide a delayed clock pulse train having the same frequency as the high speed variable clock pulse train, but with each pulse delayed from the high speed variable clock pulse train by a selected number of reference clock pulses.

A further object of the invention is to provide a delayed clock pulse train in which each clock pulse is delayed a predetermined period after the variable clock pulse train, the period being greater than the period of the variable clock pulse train.

Still another object of the invention is to provide a very high frequency synchronous counter.

Another object is to provide a very high frequency synchronous counter which may be reset after any programably selected number of counts in order to provide programable selectable frequency division.

Another aspect of the invention is to provide a means for deriving a clock pulse train in which the pulse position time can be varied over a wide time range with constant resolution and without changing frequency while remaining synchronized to another clock source of equal or greater frequency.

Another object is to provide a clock pulse train that is always equal to or lower in frequency, but precisely synchronized with the pulses of another clock pulse train.

Another object of the invention is to provide a synchronizing system wherein the only drift possible is the drift of a high frequency reference clock source.

Another very important object of the invention is to provide a multiple output pulse transformer suitable for driving a complex synchronous logic system.

A further object is to provide a multiple output pulse transformer wherein the impedances are always matched so that there are a minimum of reflections to degrade the character and synchronization of the pulses.

These and other objects of the invention are accompulished by means of a reference clock generator for producing a high frequency reference clock pulse train, first counter means connected to count a programably selected number of reference clock pulses and then reset, second counter means having at least one decade connected to increment one count each time the increment counter resets and to reset after a predetermined number of counts, programable variable clock output means connected to the first counter means and the second counter means for selectively, in the alternative, either gating out a reference clock pulse each time the first counter resets or each time one decade of the second counter resets, and programable sample clock output means including comparator logic means connected to the first and second counters for detecting a programed count on the counters and gating out a reference clock pulse each time that both counters reach a programed count.

In accordance with another aspect of the invention, a programable delayed clock output means is provided which is initiated by the variable clock output means for gating out a reference clock pulse a programed number of reference clock pulses after each variable clock pulse.

In accordance with other aspects of the invention, various novel components are provided including a multiple output pulse transformer, a high speed synchronous counter, a high speed, asynchronous digital comparator, a resetable counter, a multidecade counter, and a delayed counter as will hereafter be described in greater detail and pointed out with particularity in the appended claims.

The novel features believed characteristic of this invention are set forth in the appended claims. The invention itself, however, as well as other objects and advantages thereof, may best of understood by reference to the following detailed description of illustrative embodiments, when read in conjunction with the accompanying drawings, wherein:

FIGURES 5a–5f are schematic block diagrams which collectively disclose the test system;

FIGURE 6 is a schematic drawing illustrating the manner in which FIGURES 5a–5f should be arranged so that the lines extending between sheets will register and provide a composite diagram;

FIGURE 8 is a timing diagram for the system of FIGURES 5a–5f;

FIGURE 9 is a timing diagram illustrating the automatic sequence for dynamic measurement;

FIGURE 11 is a timing diagram which illustrates the automatic sequence during major scan I with other than peak storage;

FIGURE 12 is a timing diagram which illustrates the automatic sequence during major scan with peak storage;

Figure 13B:
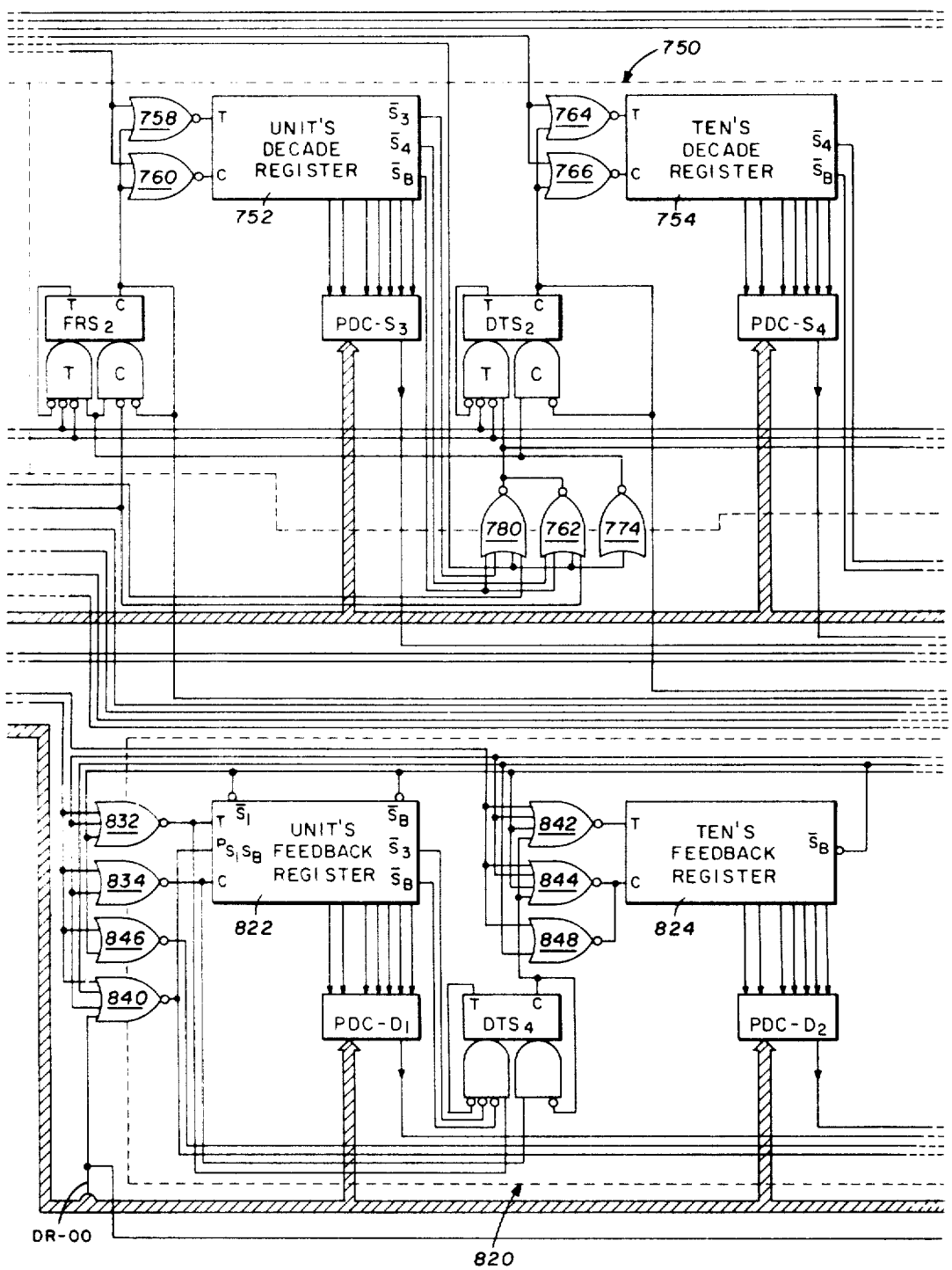
Figure 13C:
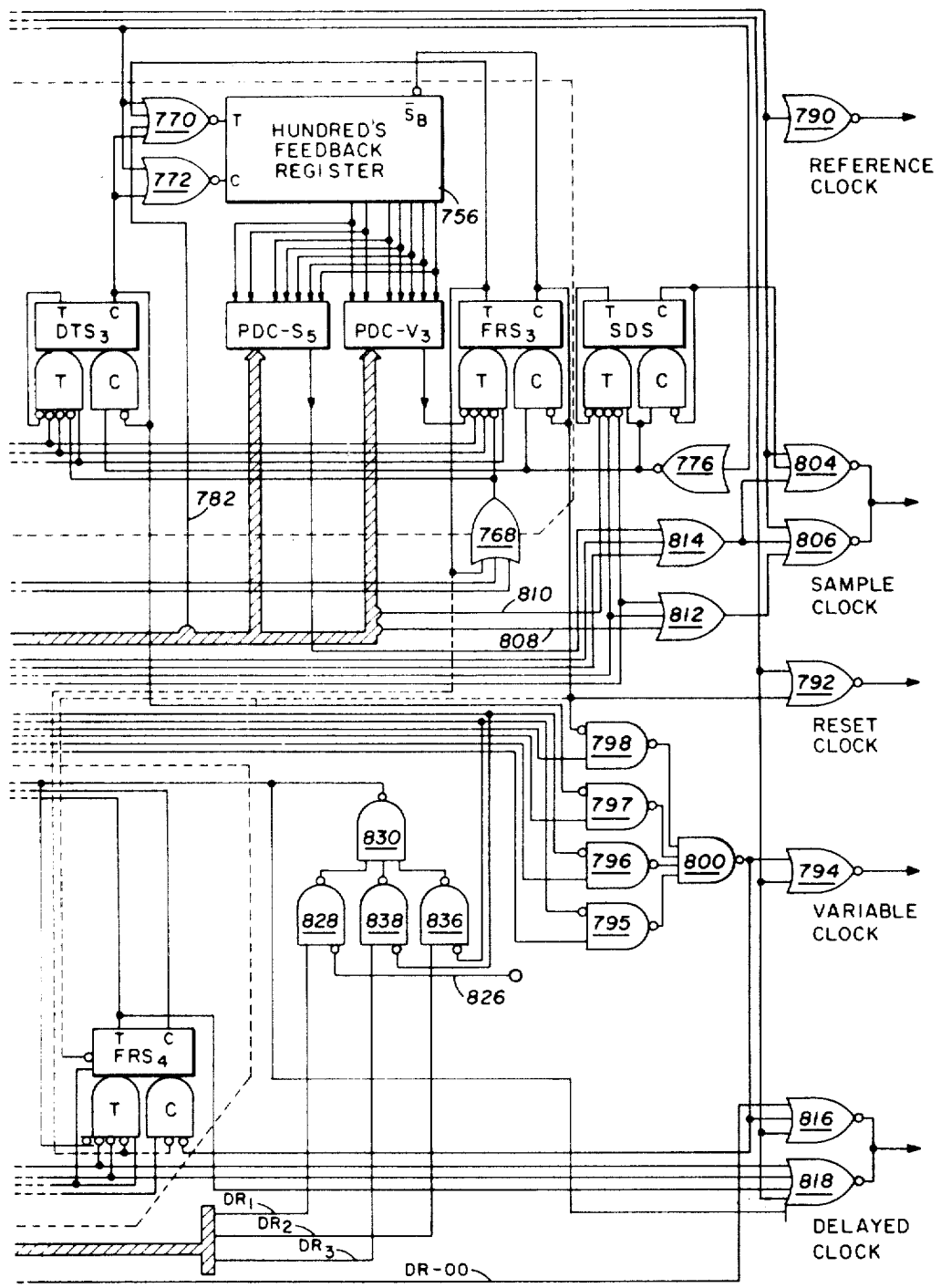
Figure 14A:
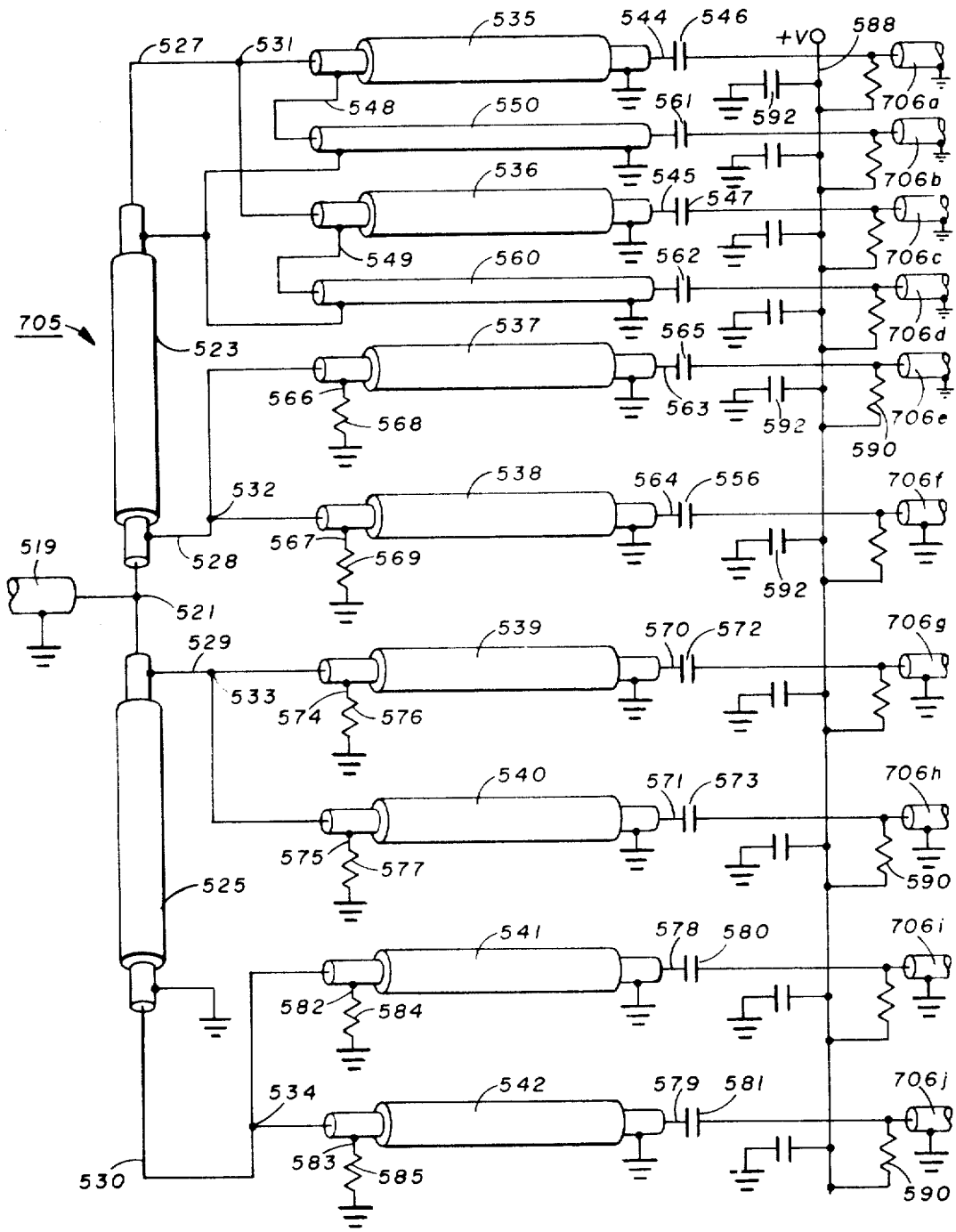
Figure 15:
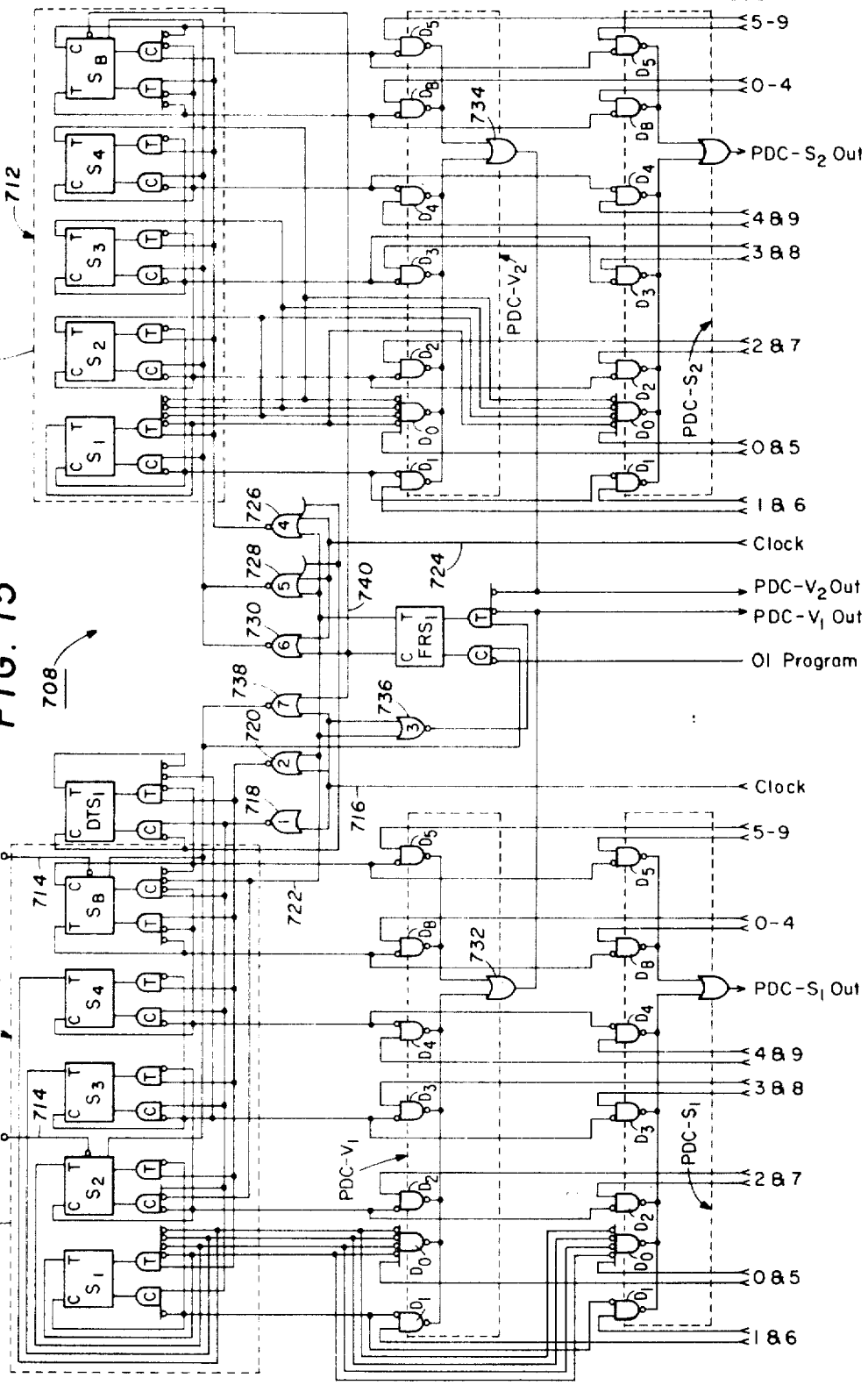

FIGURES 13a, 13b and 13c, taken collectively, are a schematic logic diagram of the synchronization system of the present invention;

FIGURE 14 is a schematic diagram illustrating the manner in which FIGURES 13a–13c should be combined to produce a single composite drawing;

FIGURE 14a is a schematic circuit diagram illustrating the multiple output pulse transformer of the digital synchronization system shown in FIGURES 13a–13c; and FIGURE 15 is a schematic logic diagram of the increment counter and associated control circuitry of the digital synchronization system.

Figure 1:
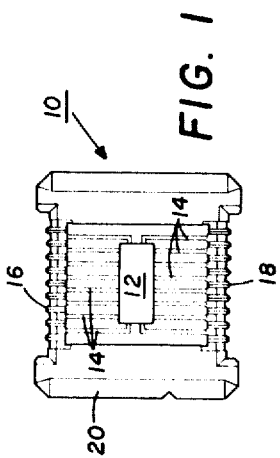
FIGURE 1 is a plan view of a typical electronic device, mounted on a plastic carrier frame, of the type which may be tested by a system utilizing the synchronization system of the present invention.

Referring now to the drawings, a typical integrated circuit component which may be tested by the measuring system herein described is indicated generally by the reference numeral 10 in FIGURE 1. The device 10 is comprised of a flat package 12 in which the semiconductor wafer is located. Sixteen leads 14 extend from the flat pack and are crimped around the ribs 16 and 18 of a plastic frame 20 which facilitates handling, testing and shipment of the device. Although the device 10 is illustrated as having sixteen leads, and the system illustrated has a capacity of handling only sixteen leads for dynamic testing, it is to be understood that within the broader aspects of the invention a device having substantially any number of leads may be tested by proper modification of the test station and system.

Test station subsystem

The device 10 is received in a test socket 22 of a high frequency test station indicated generally by the reference numeral 25. The test station 25 is comprised of the socket board 24 and socket 22, a relay unit 26, and a performance board 28.

The test socket 22 has a number of leaf spring contacts 23 each of which engages and makes electrical contact with each of the device leads 14. The socket 22 is mounted on a printed circuit socket board 24 which is plugged into the relay unit 26 by connectors 30. Suitable printed circuits formed on the socket board 24 electrically connect the leaf spring contacts 23 and the respective connectors 30. The socket 22 and socket board 24 are specially designed for each different type of device being tested. To insure that the proper test socket is being used for a particular test, an identification code is formed by a printed circuit (represented schematically at 32) on the socket board 24 and this code is fed out through contacts 34, which are mounted on a plate 36, to a control unit which will hereafter be described.

The relay unit 26 (see FIGURE 5d) has nine high frequency relays $R_1$ through $R_9$ for each of the sixteen device leads $L_1$ through $L_{16}$. Thus the nine relays for lead $L_1$ are designated $L_1R_1$ through $L_1R_9$, etc. Each relay $L_nR_m$ is comprised of a glass encapsulated reed switch which is controlled by a coil wound around the glass capsule. The relays $L_nR_n$ are mounted in a circular housing 40 which is divided into four quadrants by radial partitions 41, 42, 43 and 44. Each quadrant, for example the quadrant between radial partitions 44 and 41, is divided into five segments by an insert 46 having radial partitions 47, 48, 49 and 50. Four upper printed circuit boards 60 overlay the top of each quadrant and four lower printed circuit boards 62 form the bottom of each quadrant. Each of the relays $L_nR_n$ is mounted between the upper and lower printed circuit boards with the relays structurally interconnecting the boards. This construction permits each of the segments to be merely dropped into the quarter segments of the circular housing 40 and hang suspended from the upper boards 60. The lead wire extending from the lower end of each of the relays $L_nR_n$ protrudes through the respective lower printed circuit board 62 and into female connector 64 on a printed circuit adapter board 66. The adapted board 66 has leaf spring contacts 68 on its under surface which are electrically connected to the various female connectors 64 by printed circuits on the adapter board 66. The spring contacts 68 are conveniently arranged in two concentric circles.

The circular housing 40 is keyed into a ring 74, and the adapter board 66 is connected to the ring 74 by peripherally spaced screws 76 and standoffs 78. The entire relay unit 26 is received in an opening 80 cut in a tabletop 82 and is suspended from the upper plate 36 by screws 70 which extend through the ring 74 and standoffs 72 and are connected to a plate 36. The plate 36 rests on the tabletop around the periphery of the opening 80.

The performance board 28 has a large number of button contacts 86 which are arranged in two concentric circles and spaced to engage the spring contacts 68 on the lower surface of the adapter board 66. As will hereafter be described in greater detail, the performance board 28 is customized for each different type device 10 being tested and accordingly is made easily removable. This is accomplished by resting the performance board 28 on a tray 90 having a peripheral lip 92 and pedestal supports 94, together with suitable aligning means (not illustrated). The tray 90 is supported by suitable camming means represented schematically at 96 which are carried by a drawer 98. The drawer has rollers 100 which ride on tracks 102 which are secured to the desk top 82 or other support means. When the camming means 96 are rotated, the tray 90 and performance board 28 are lowered from the adapter board 66 so that the drawer may be pulled out and the performance board replaced. The electrical connections of the test station 25 are hereafter described in connection with FIGURE 5d.

Figure 5A:
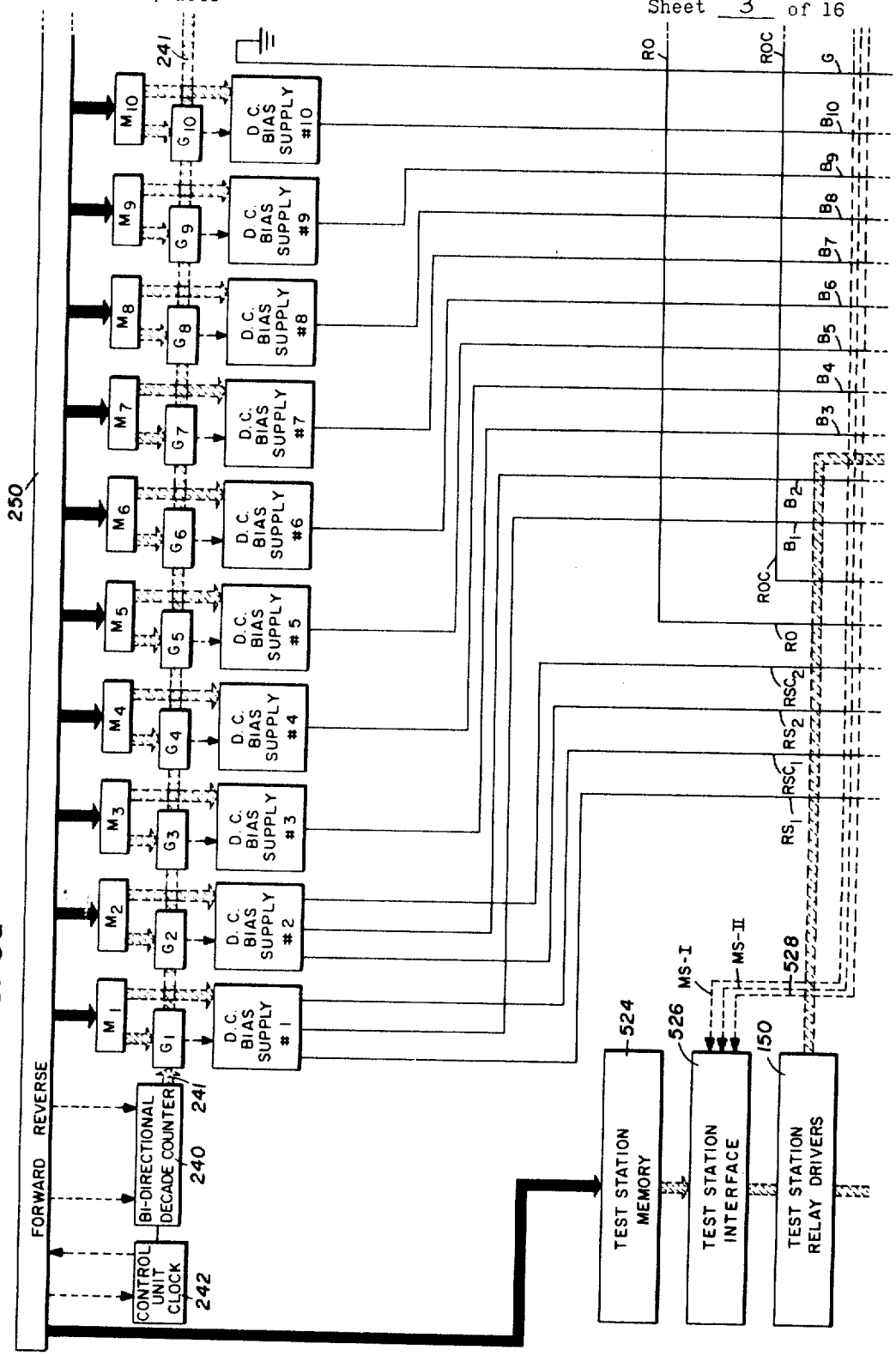
Figure 5B:
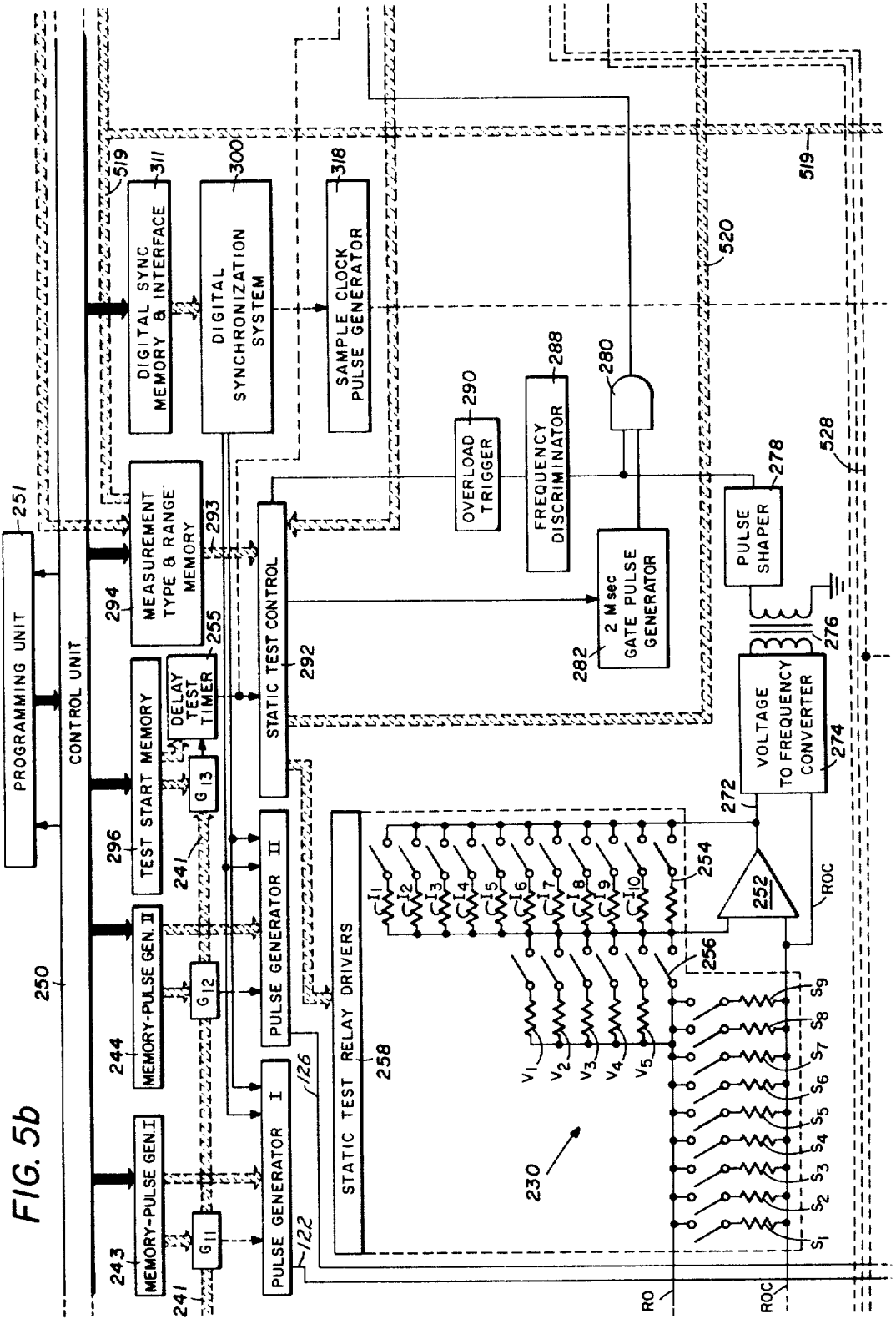
Figure 5D:
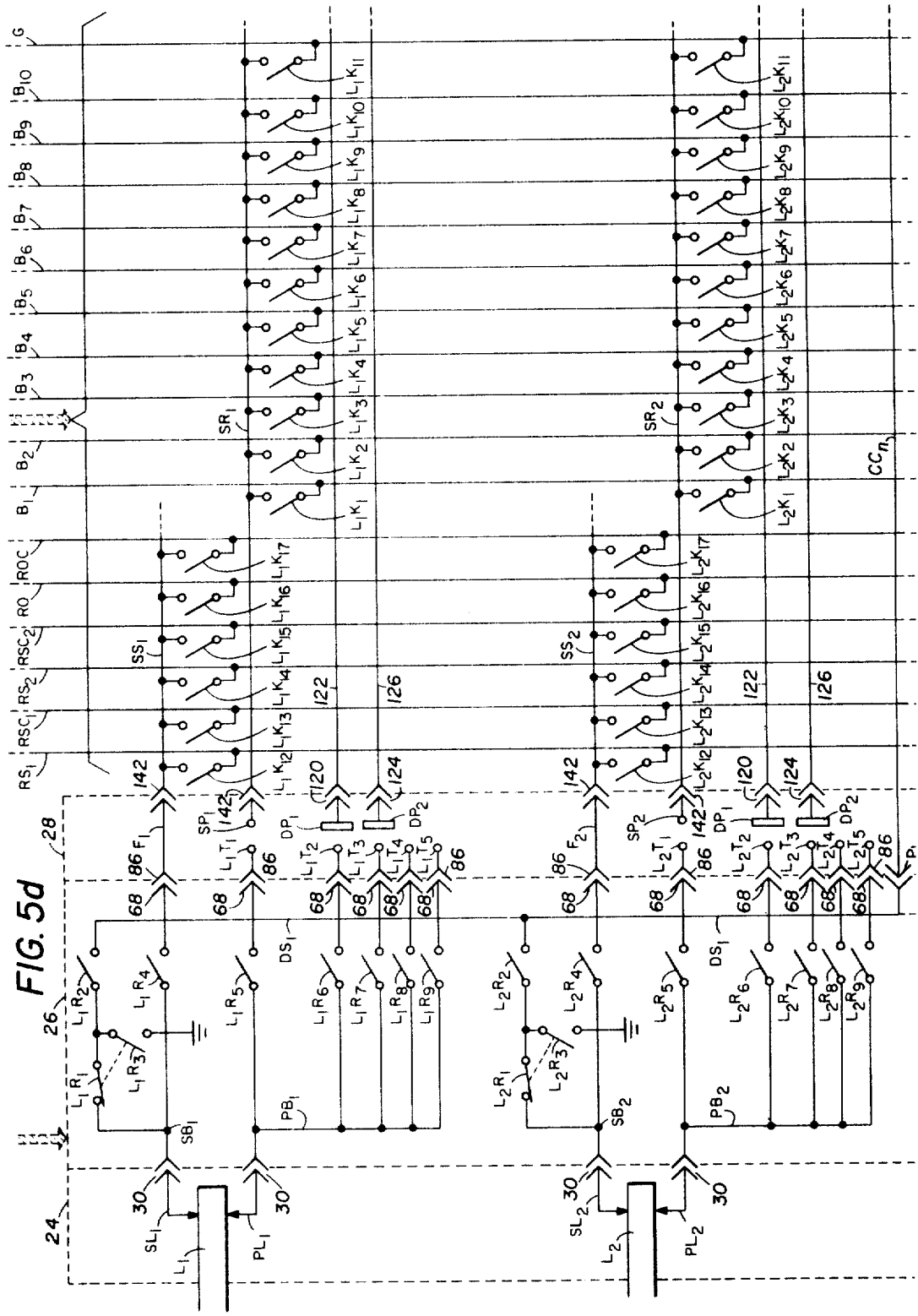

Referring now to FIGURES 5a–5f, and in particular to FIGURE 5d, two leads of the device under test are illustrated schematically and designated by the reference characters $L_1$ and $L_2$. It should be noted that the device leads $L_3$–$L_{16}$, as well as the components associated with device leads $L_3$–$L_{16}$, are not illustrated in FIGURE 5d, but are mentioned merely to assist in understanding the test station. The socket board 24 has power leads $PL_1$–$PL_{16}$ which are electrically connected to the device leads $L_1$–$L_{16}$ and to power buses $PB_1$–$PB_{16}$ on the upper printed circuit board 60 by the connectors 30. The power buses $PB_1$–$PB_{16}$ are connected through relays $L_nR_5$–$L_nR_9$ to the leaf spring contacts 68 on the adapter board 66. The buttons 86 on the performance board 28 which mate with the contacts 68 are connected to power terminals $L_nT_1$–$L_nT_5$.

Figure 4:
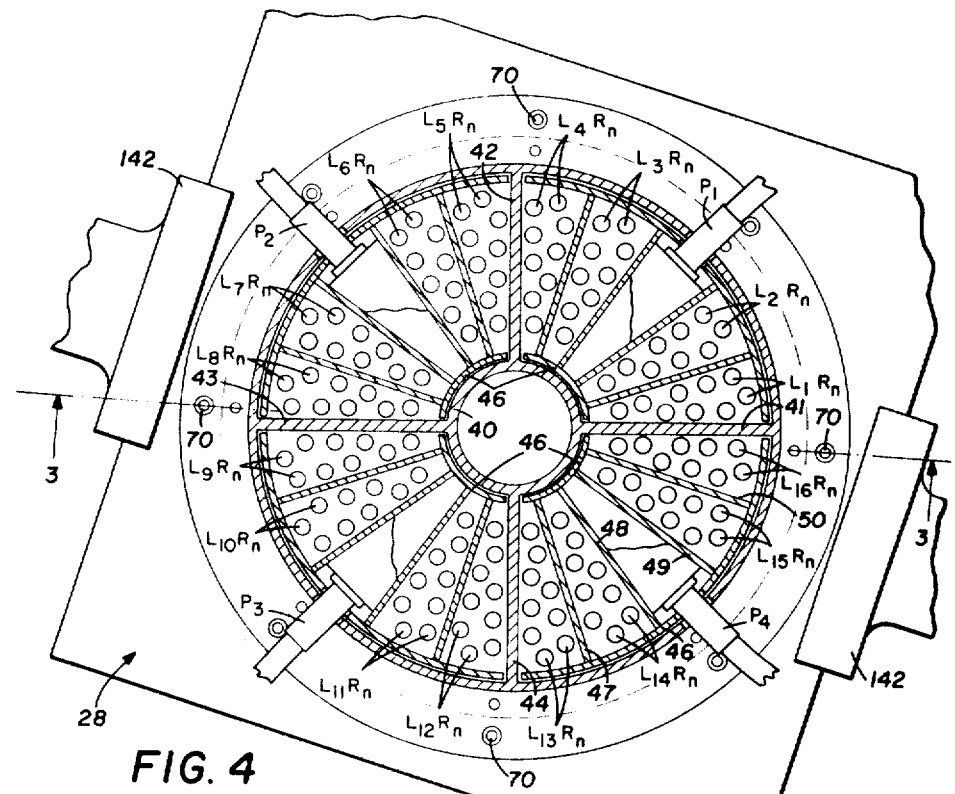
FIGURE 4 is a somewhat schematic sectional view taken substantially on lines 4—4 of FIGURE 3.

Kelvin type sense leads $SL_1$–$SL_{16}$ on the socket board 24 are each connected by one of the connectors 30 to sense buses $SB_1$–$SB_{16}$. D.C. sensing measurements are made through relay $L_1R_4$, and the conductor comprised of a spring contact 68 and button contact 86 on the performance board 28. In most cases, a direct feed-through conductor $F_1$–$F_{16}$ will be formed on the performance board to connect the button 86 to a connector 142 presently to be described, and finally to a static sense bus $SS_n$ for each lead. Dynamic sensing is provided through relays $L_nR_1$ and $L_nR_2$ to dynamic sense buses $DS_1$–$DS_4$, each of which may be conveniently located on either the upper or lower printed circuit boards 60 or 62 of each quadrant to interconnect the four relays $L_nR_2$ in that quadrant. For example, relays $L_1R_2$–$L_4R_2$ would be connected to dynamic sense bus $DS_1$. Similarly, the groups of relays $L_5R_2$–$L_8R_2$, $L_9R_2$–$L_{12}R_2$, and $L_{13}R_2$–$L_{16}R_2$ would be connected to dynamic sense buses $DS_2$, $DS_3$ and $DS_4$, respectively, which are not illustrated. Four bayonet type probe connectors $P_1$–$P_4$ are then connected to the dynamic sense buses $DS_1$–$DS_4$, respectively. The probe connectors $P_1$–$P_4$ are physically passed through the wall of the circular housing 40 into a female receptacle disposed in the center segment of each of the four quadrants as can best be seen in FIGURE 4.

Figure 3:
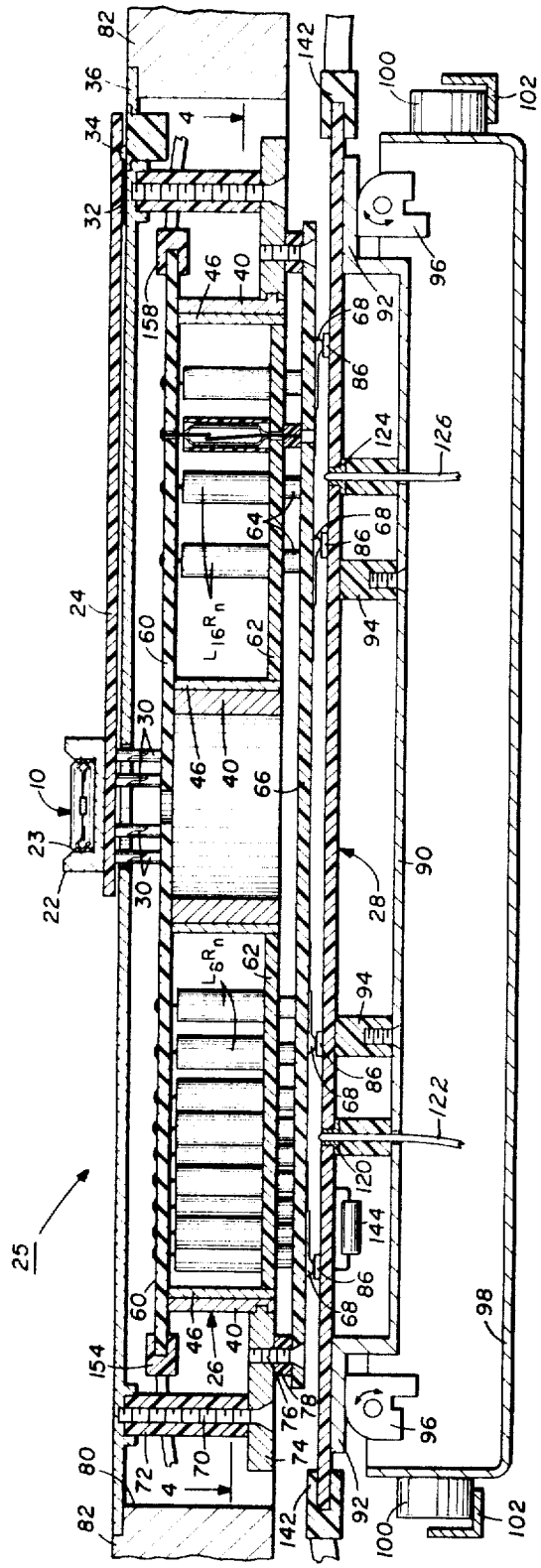
FIGURE 3 is a somewhat schematic sectional view of the test station of FIGURE 2 taken substantially on lines 3—3 of FIGURE 4.

Static bias supply terminals $SP_1$–$SP_{16}$ are formed on the performance board 28 for leads $L_1$–$L_{16}$, respectively. The sixteen straight through conductors $F_1$–$F_{16}$ are connected to static sense buses $SS_1$–$SS_{16}$ by multilead connectors 142 which may be seen at each edge of the performance board 28 in FIGURE 3. A pair of dynamic stimuli buses $DP_1$ and $DP_2$ are provided on the performance board 28 and made available for connection to any one of the terminals $L_nT_1$–$L_nT_5$ at any one of the leads $L_1$–$L_{16}$ by means which will presently be described. The dynamic stimulus buses $DP_1$ and $DP_2$ on the performance board 28 may be circular in form and the terminals $L_nT_n$ arranged in a circle to facilitate connecting any of the terminals $L_nT_1$–$L_nT_5$ to either of the buses $DP_1$ or $DP_2$ by a jumper wire or load device as hereafter described. Bus $DP_1$ may be connected by a small connector 120 shown in FIGURE 3 to a coaxial supply cable 122, and bus $DP_2$, may be connected by a like connector 124 to a coaxial supply cable 126. The function of the performance board 28 can best be understood after a description of the static power supplies and the dynamic pulse generators used to stimulate the device under test which will presently be described.

Figure 2:
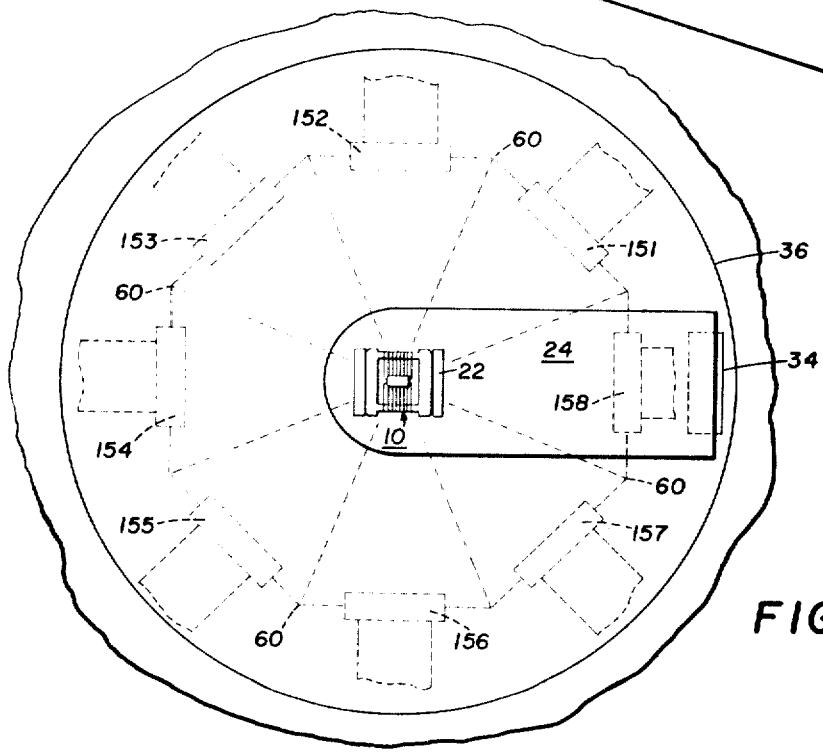
FIGURE 2 is a plan view of the test station of the test system.

Relays $L_nR_n$ are operated by current from a bank of controllable relay drivers 150. The leads from the drivers are coupled to the upper printed circuit board 60 by connectors 151–158 (see FIGURES 2 and 3). Each of the connectors 151–158 carries the conductors extending to the coils of the relays associated with the two device leads. For example, the connector 151 carries the relay driver leads to the coils of relays $L_1R_1$–$L_1R_9$ and relays $L_2R_1$–$L_2R_9$.

Ten D.C. bias supplies #1–#10 are connected to supply buses $B_1$–$B_{10}$, respectively. Each of the D.C. bias supplies is programable over a wide range with respect to both voltage and current, and when operating in the voltage mode has an automatic current limiting feature. These bias supplies are commercially available items. Each of the sixteen static relay buses $SR_1$–$SR_{16}$ may be selectively connected to any one of the buses $B_1$–$B_{10}$ by the bank of relays $L_nK_1$–$L_nK_{10}$ or to a ground bus G by relays $L_nK_{11}$ provided for each device lead. D.C. bias supplies #1 and #2 have remote sense lines $RS_1$ and $RS_2$, and remote sense common lines $RSC_1$ and $RSC_2$ each of which may be selectively connected to any one of the static sense buses $SS_1$–$SS_{16}$ by relays $L_nK_{12}$, $L_nK_{14}$, $L_nK_{13}$ and $L_nK_{15}$, respectively. The two remote sense leads for each of these bias supplies permit the sensing of either positive or negative voltages for reference purposes in the supplies. A pair of readout lines RO and ROC may also be individually connected to any one of the static sense lines by relays $L_nK_{16}$ and $L_nK_{17}$, respectively. The readout lines RO and ROC are the inputs to the static measurement subsystem 230 which will hereafter be described in greater detail. The coaxial cables 122 and 126 are connected to pulse generators I and II shown in FIGURES 5b which produce pulse stimuli of a selected frequency, amplitude and width as hereafter described in greater detail.

The function of the performance board 28 will now be described. In a sequence of measurements or tests for a multilead device, it will often be necessary to apply D.C. bias levels to one or more of the device leads $L_1$–$L_{16}$ and to apply a pulse stimulus to others of the device leads. During a sequence of perhaps twenty-five tests to be performed on a single device, these bias levels and pulse stimuli will usually change in character and will usually be applied to different leads. In order to more nearly simulate the actual operating conditions, it will usually be necessary to connect some type of load in the bias or pulse stimulus circuit of the device, and the load value and character will often vary from test to test on a given device, and will nearly always vary for devices of different types. For this reason, the relay terminals $L_nT_2$–$L_nT_5$ and the static power terminals $SP_1$–$SP_{16}$ and dynamic power terminals $DP_1$ and $DP_2$ are oriented on the printed circuit board in close proximity. This provides great flexibility in that any terminal $L_nT_1$–$L_nT_5$ of each lead can be connected to any one of the supply buses $SP_1$, $DP_1$ or $DP_2$ either directly by a jumper wire or through an electronic component of the proper type and value, such as a resistor (indicated by the reference numeral 144 in FIGURE 3), a capacitor or a resistor-capacitor network. This permits any device lead $L_n$ to be connected to any one of the ten D.C. bias supplies by connecting one of the terminals $L_nT_1$–$L_nT_5$ to the adjacent bus $SP_n$ and closing the corresponding switch $L_nK_n$. Then when the appropriate relay $L_nR_5$–$L_nR_9$ is closed during the proper test period, the lead will be connected to the selected power supply. Similarly, any one of the leads $L_1$–$L_{16}$ may be connected to either of the pulse generators I or II by wiring one of the terminals $L_nT_1$–$L_nT_5$ to the appropriate bus $DP_1$ or $DP_2$. As mentioned, this wiring may include a suitable electronic component selected to provide the desired circuit load. Any lead $L_1$–$L_{16}$ may be connected to ground, through a load if desired, by connecting one of the terminals $L_nT_1$–$L_nT_5$ to the adjacent bus $SP_n$ and closing the proper switch $L_nK_{11}$. The presence of the five terminals $L_nT_1$–$L_nT_5$ and controlling relays $L_nR_5$–$L_nR_9$ permits any one lead to be connected to the same power bus $SP_1$, $DP_1$ or $DP_2$ by different load components for different tests. Up to ten different D.C. bias leads may be used during any one time and any one bias supply may be connected to any number of device leads simultaneously. The provision of two pulse generators which are synchronously controlled as hereafter described permits the application of two related pulse trains to different terminals of the device.

Both static and dynamic sensing, as well as the remote sensing for D.C. bias supplies #1 and #2, are made through a Kelvin connection to the particular lead. Static measurements are made by closing relay $L_nR_4$ and opening relays $L_nR_2$ and $L_nR_3$ and closing the appropriate relay $L_nK_{16}$ or $L_nK_{17}$. Dynamic measurements are made by opening relay $L_nR_4$ and closing relays $L_nR_1$ and $L_nR_2$. The probes are grounded during the storage of a reference voltage in the dynamic measuring subsystem as will hereafter be described by opening relay $L_nR_1$ and closing relays $L_nR_2$ and $L_nR_3$. It should be noted that relays $L_nR_1$ and $L_nR_3$ are always operated in the alternative as represented by the interconnecting dotted line.

The time at which each of the D.C. bias supplies #1–#10 and the pulse generators I and II is activated may be programed so that the bias voltages and pulse stimuli may be applied to the device under test in any desired sequence in order to protect the device. A bidirectional decade counter 240 sequentially energizes ten successive sequence lines 241 on ten successive pulses of the control unit clock 242. The ten sequence lines 241 extend to each of thirteen gate logic circuits $G_1$–$G_{13}$. Shift register memories $M_1$ through $M_{10}$ store program information for the D.C. bias supplies #1–#10, respectively. Each of the memories $M_1$–$M_{10}$ stores information concerning the type and level of bias to be supplied, whether the voltage is to be referenced based upon the voltage at the device lead or at the supply, the time at which the bias supply is to be activated, etc. Memories 243 and 244 store similar information for the pulse generators. An activate signal is gated to each respective bias supply and pulse generator by the respective gate logic systems $G_1$–$G_{12}$ when the logic level of the sequence line programed for the particular supply or generator changes from "0" logic level to a "1" logic level.

*System operating sequence*

The operating sequence of the system may be best understood by reference to the timing diagram of FIGURE 8. The entire system is operated by the control unit 250. One of the principal functions of the control unit 250 is to route the program information from the programing unit 251 to the various shift register memories of the system which have been or will be described. Operation of the control unit 250 is synchronized by the control unit clock 242, the output of which is indicated by the time line 604. After operation of the system is initiated from the control unit 250, all program information for test No. 1 is routed into and stored in the respective memories during the period starting at 602a and ending at 602b.

The programing unit 251 may be of any conventional type, such as magnetic, punched card, punched tape, or computer, so that a sequence of different tests, including major scans I and II for a dynamic measurement, or a static measurement, can be easily repeated for successive test devices. As mentioned, the control unit 250 starts and stops the program unit 251 and routes the information from the programing unit to the appropriate memory as a result of a coded address at the beginning of each set of program information to be put in a particular register. Since all memories are shift registers, the memory must be completely filled in order to place the information in the proper bits of the shift register. The programing unit is automatically stopped after each test has been programed by a stop signal in the program. The use of addressable shift register memories saves a considerable amount of programing time because for each succeeding test, only the registers in which a test condition is to be changed need be reprogramed.

After the programing has been completed, as indicated by a signal from the programing unit to the control unit, the bi-directional decade counter 240 is activated to count the control unit clock pulses 604 in the forward direction and sequentially bring the ten sequence lines #1–#10 (which are indicated collectively by the reference numeral 241 in FIGURE 5a) up to a logic "1" level as indicated by the time lines in FIGURE 8. As previously described, any one of the D.C. bias supplies #1–#10 or the pulse generators I and II may be activated by a signal gated through the logic gate circuits $G_1$–$G_{12}$, respectively, by one of the sequence lines and a program line from the respective memories $M_1$–$M_{10}$, 243 and 244. In the same manner, any one of the ten sequence lines together with a program line from a test start memory 296 may gate a test start signal represented by the time line 608 from the logic gate circuit $G_{13}$ to a delay test timer 255. The delay test timer produces a delay test pulse represented by the time line 610 upon receipt of the test start signal 608. The delay test pulse 610 continues for a time determined by program information from the test start memory 296 to permit the device under test to stabilize. After the delay test pulse 610, a test read signal represented by the time line 612 is sent to the static test control 292 and to the dynamic sequence timetable 470 which will hereafter be described. A start measurement signal 614 is then generated in both the static and dynamic measuring subsystems to initiate automatic operation of each of the subsystems in accordance with the program instructions.

Upon the completion of the static or dynamic measurement, a test complete signal 616 is sent back to the control unt 250 which generates a record test results signal 618, reverses the bidirectional counter 240, and starts rippling down the sequence lines #1–#10 in reverse order, and also terminates the test start signal 608, terminates the test read signal 612, and terminates the start measurement signal 614. As soon as sequence line #1 has returned to "0" logic level, the program load signal 602 is sent to the programming unit 251 and the program information for test No. 2 is fed into the shift register memories. Upon completion of the programming for test No. 2 as indicated by the fall 602 of the program load signal, or the termination of the recordation of the data from test No. 1, as determined by the fall of the record test result signal 618, the sequence lines #1–#10 are again rippled up and the second test proceeds in the same manner.

*Static measurement subsystem*

The readout lines RO and ROC are connected to the inputs of a static measuring subsystem indicated generally by the reference numeral 230. The subsystem includes a differential, operational amplifier 252 which is used to make both voltage and current measurements between the two lines RO and ROC. The readout common line ROC is always connected to one input of the amplifier 252. The readout line RO is connectable through one of five attenuating resistor-relay branches $V_1$–$V_5$ to make voltage measurements in different ranges, since the resistor values in the branches are different to provide different degrees of attenuation. A resistor-relay branch 254 is also closed to provide a feedback loop for the amplifier of a standard resistance value for all voltage measurements. For current measurements, one of nine resistor-relay branches $S_1$–$S_9$ is first closed across the input leads RO and ROC and the voltage drop across the branch measured by closing one of branches $V_1$–$V_5$, depending on the range, for a brief sample period during which the voltage drop across $S_1$–$S_9$ is sampled to determine whether or not the current to be measured is of such a magnitude as to drive the amplifier 252 into hard saturation. If not, the closed resistor-relay branch $S_n$, the closed branch $V_n$, and relay 254 are opened, and the relay 256 is closed and one of the resistor-relay branches $I_1$–$I_{10}$ is closed in the feedback loop of the amplifier 252 to provide a direct current measurement. The current measurement range is selected by the different values of the resistors in branches $I_1$–$I_{10}$. The resistance values of the branches $S_1$–$S_9$ correspond to the ranges produced by branches $I_1$–$I_9$, and branch $V_5$ alone corresponds to branch $I_{10}$ during the brief initial test period. All of the resistor-relay branches $V_1$–$V_5$, $I_1$–$I_{10}$, and $S_1$–$S_9$ and relays 254 and 256 are controlled by individual drivers in a relay driver bank indicated by the reference numeral 258.

The voltage differential between the output 272 and the common readout line ROC is applied to a voltage-to-frequency converter 274. The voltage-to-frequency converter is a commercially available item and produces a frequency proportional to the input voltage. The output of the converter 274 is coupled by a transformer 276 to a pulse shaper 278. As a result of the transformer coupling, the amplifier 252 and the converter 274 are free floating and thus measure the voltage between any two leads of the device. The pulse shaper 278 converts the frequency to a pulse train which can be counted by a digital data counter. The digital counter is then enabled for two milliseconds, as will hereafter be described in greater detail. For purposes of the present description, however, it may be considered that the pulse from a two millisecond gate pulse generator 282 gates the pulse train from the pulse shaper 278 through an AND gate 280 to a data counter control 284 which gates the pulse train through to a data counter 286 during a static measurement. The gate pulse generator 282 is initiated by a five millisecond test read signal from a static test control 292.

The output from the pulse shaper 278 is also fed to a frequency discriminator 288 which is set to detect a frequency representative of about 250% of range. The output of the discriminator 288 fires an overload trigger 290 when the frequency exceeds the preselected level. The output of the overload trigger is fed to the static test control 292 which controls the operation of the relay driver 258. Upon receipt of an overload signal from the overload trigger, branches $V_1$–$V_5$ and relay 256 are immediately opened to prevent driving the amplifier 252 into hard saturation.

The static test control receives program instructions from the measurement type and range memory 294 which specify the type of static measurement, whether voltage or current, and the range.

The static measurement system also has an autorange capability as represented by the automatic range control 295. If the count of the data counter is either less than a predetermined minimum, such as 20% of range, or greater than a predetermined maximum, such as 199% of range, then a signal is fed back from the automatic range control 295 to the static test control to change the range to the next lower or next higher range and the measurement repeated. A static test is started on command from the delay test timer 255.

*Dynamic measuring subsystem*

Figures 7, 10:
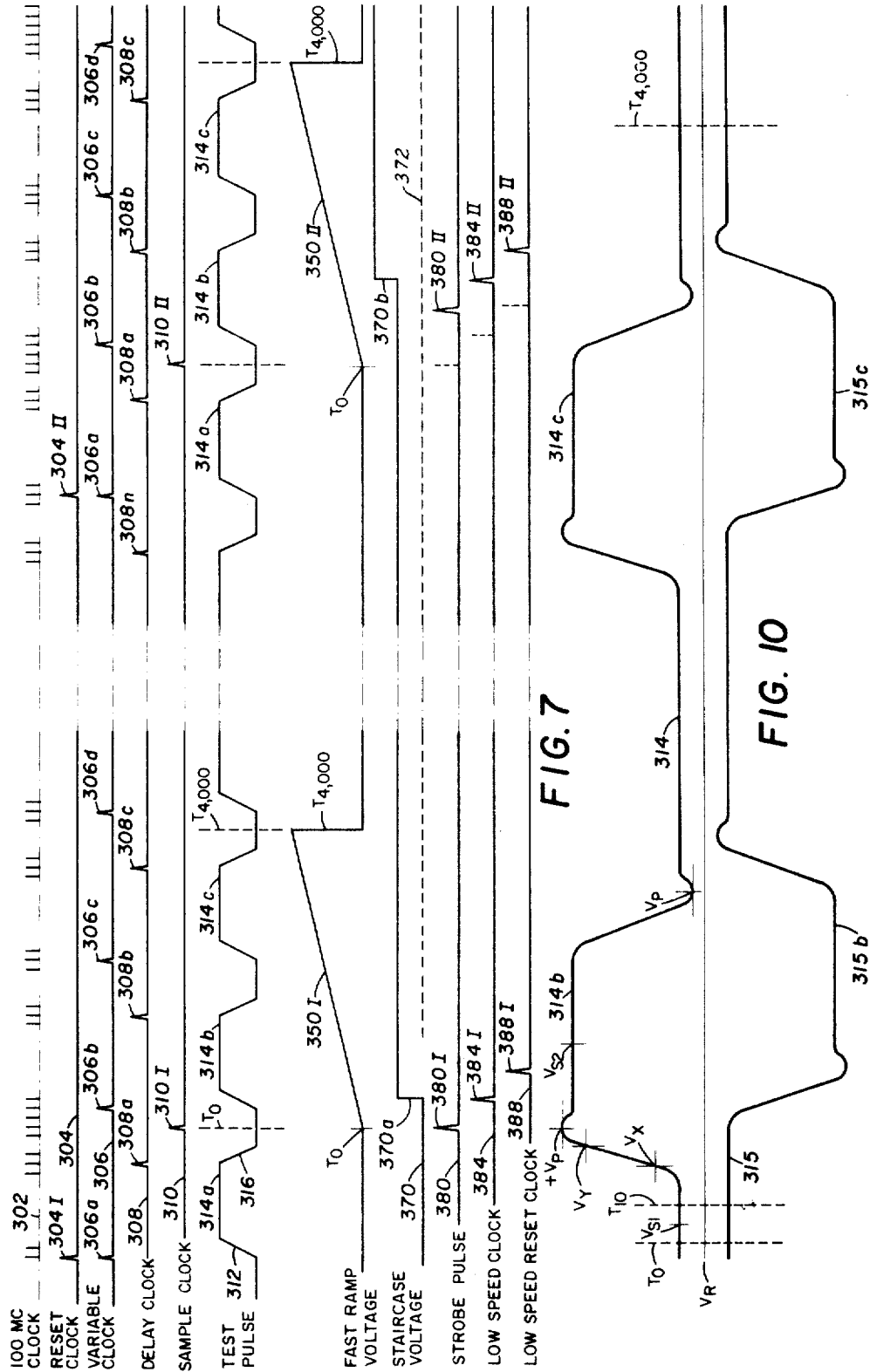
FIGURE 7 is a timing diagram which illustrates the operation of the synchronization of the present invention and the derivation of the sample pulse and the low speed logic clock.
FIGURE 10 is a timing diagram illustrating a pair of typical repetitive waveforms which may be measured by the method and system of this invention.

Synchronization for dynamic measurements is provided by a digital synchronization system 300. Referring to FIGURE 7, the synchronization system 300 generates a high frequency reference clock, such as the 100 megacycle clock represented by time line 302, a reset clock represented by the time line 304, a variable clock represented by the time line 306, a delay clock represented by the time line 308, and a sample clock represented by the time line 310. The last four clock pulses all occur in precise synchronization with a pulse of the high frequency reference clock. The period between pulses 304I, 304II, etc., of the reset clock 304 may be selected by programing to occur after any number of reference clock pulses 302, such as from one thousand reference clock pulses to one hundred thousand reference clock pulses. The reset period of the reset clock may conveniently be considered as a logic word having from one thousand to one hundred thousand bits. The variable clock represented by the time line 306 may be programed to occur a predetermined number of times within each reset period. The delay clock represented by the time line 308 may be programed to occur at any selected number of reference clock pulses up to one hundred after the occurrence of each variable clock pulse. The sample clock represented by the time line 310 may occur only once during each reset clock period, but may be programed to occur in synchronism with any reference clock pulse within the period. The reset, variable, delay and sample clocks are programed from a digital sync memory and interface 311.

Referring now to FIGURES 13a–13c, the digital synchronization system 300 is comprised of a highly accurate high speed clock source 702 such as, for example, a 100-megacycle oven controlled crystal oscillator. The clock source 702 is coupled to a pulse shaping circut 704 which produces a square pulse of the desired amplitude and width. The pulse shaper 704 is coupled to the input of a novel multioutput coaxial pulse transformer 705 having a plurality of output leads indicated collectively by the reference character 706. Each of the leads 706 is normally at a logic "1" level and goes to a logic "0" level with each clock pulse, the logic levels being typically +0.3 volt and −0.3 volt, respectively. In order to have an accurate measuring system, it is extremely important that the pulses occurring on each of the leads 706 be precisely synchronized with the pulses on the other leads in order to provide a precise cadence for the operation of all components of the digital synchronization system.

The pulse transformer 705 is shown schematically in FIGURE 14a. The input of the transformer 705 is a single coaxial cable 519 the shield of which is grounded so that the coaxial cable acts as a transmission line. In accordance with an important aspect of the invention, all impedances throughout the transformer are matched so that no energy is reflected at any point, and all coaxial cables should have the same characteristic impedance. In order to facilitate an understanding of the invention, it will be assumed that all coaxial cables have a 50-ohm characteristic impedance. However, it is to be understood that coaxial cables having other characteristic impedances could be used, so long as these impedances are matched in accordance with the scheme which will hereafter become more evident.

The cable from the coaxial input 519 is connected to the input 521 of a first transformer stage comprised of a pair of ferrite cored coaxial cables 523 and 525. The ferrite cores on the coaxial cables 523 and 525, as well as ferrite cores which will hereafter be described, are not essential to the function of the transformer, but do improve performance by reducing transmission losses through the coaxial cable when the coaxial cable is connected as a transformer. Also, in order to have optimum performance, the time lengths of the coaxial cables 523 and 525 should be at least equal to one-half the width of the pulses to be transformed. The first transformer stage 523–525 has four output conductors 527, 528, 529 and 530, the outputs 527 and 530 being the ends of the conductors of the coaxial cables 523 and 525, respectively, remote from the input 521, and the outputs 528 and 529 being the ends of the shields of the coaxial cables 523 and 525, respectively, adjacent the input 521. Of course, it will be appreciated that the shields of the three coaxial cables connected to the input point 521 will be as nearly continuous as is mechanically possible in order to obtain the best results.

The ouputs 527–530 are connected to the inputs 531–534 of four secondary transformer stages comprised of ferrite cored coaxial cables 535 and 536, 537 and 538, 539 and 540, and 541 and 542, respectively. Each of the secondary transformer stages is identical to the primary transformer stage comprised of coaxial cables 523 and 525 and accordingly has four outputs. For example, secondary transformer stage 535–536 has outputs 544 and 545 which are coupled by capacitors 546 and 547 to coaxial lines 706a and 706c, and outputs 548 and 549 which are connected by coaxial transmisison cables 550 and 560 and coupling capacitors 561 and 562 to coaxial lines 706b and 706d. The secondary transformer stage 537–538 has outputs 563 and 564 which are coupled by capacitors 565 and 556 to coaxial cables 706e and 706f, and outputs 566 and 567 which are terminated through 50-ohm resistors 568 and 569 to ground. Similarly, the transformer stage 539–540 has outputs 570 and 571 which are coupled by capacitors 572 and 573 to coaxial cables 706g and 706h, while the other outputs 574 and 575 are terminated through 50-ohm resistors 576 and 577 to ground. The transformer stage 541–542 has outputs 578 and 579 which are coupled by capacitors 580 and 581 to coaxial cables 706i and 706j, while the outputs 582 and 583 are terminated through 50-ohm resistors 584 and 585 to ground. A suitable positive bias source is connected to bus 588. The bus 588 is connected to the cable of each coaxial transmisison line 706a–706j by a separate resistor 590, only some of which are indicated by reference characters. At each point where a resistor 590 is connected to the bus 588, the bus is also coupled to ground through a capacitor 592, only a portion of which are represented by reference characters.

In the operation of the transformer 705, assume that a −4-volt pulse is applied to input terminal 521 from the coaxial transmission cable 519 which extends from the pulse shaper 704. As mentioned, the characteristic impedance of the coaxial cable 519 is 50 ohms. In order to provide an impedance match, the input impedance at point 521 must also be 50 ohms, which is the case as will now be described. The input impedance at input 532 is 50 ohms because of two 100-ohm series circuits which are connected in parallel. One of the circuits is comprised of the 50-ohm resistor 568 and the 50-ohm resistance between the shield and the cable of coaxial cable 538, and the other is comprised of resistor 569 and the resistance between the shield and cable of coaxial cable 538. Similarly, the input impedance at point 533 is 50 ohms because of the parallel 100-ohm circuits through resistors 576 and 577. Thus the input impedance at point 521 is also 50 ohms to match the impedance of transmission line 519, because each of the circuits to the outputs 528 and 529 is 100 ohms, as a result of the 50-ohm resistance between the cable and the shield of coaxial cables 523 and 525, and the 50-ohm input impedance at points 532 and 533. Thus the input impedance at input 521 matches the impedance of the transmission line 519 so that none of the energy is reflected back through the transmission line. The incoming pulse is divided equally between the cable of the coaxial cable 523 and the shield at output 528 at the shield so that, assuming a −4-volt input pulse, a −2-volt pulse will appear on output cable 528 and a −2-volt pulse will propagate down the coaxial cable 523 to the output 527. Similarly, a −2-volt pulse will appear on output cable 529 and a −2-volt pulse will propagate down the coaxial cable 525 to the output 530.

When the pulse from output 527 reaches input 531, the input impedance of the transformer stage 535–536 is again 50 ohms because of the two parallel 100-ohm paths each comprised of the 50-ohm resistance between the conductor and the shield of the respective coaxial cables 535 and 536, and the 50-ohm characteristic impedance of the coaxial transmission cables 550 and 560. Similarly, the pulse at the output 530 sees a 50-ohm impedance at input 534 of the transformer stage 541–542 which is identical to the transformer stages formed by coaxial cables 537–538 and 539–540.

Thus it will be noted that as the result of a single −4-volt pulse applied at the input 521, a −2-volt pulse is produced at each of the outputs 527–530. Since all impedances are matched, there are no reflections at any point in the first transformer stage to degradate the character of the pulses. It is also important to note that there is substantially no loss of power in the transformer stage. When the —2-volt pulse reaches input 531, a —1-volt pulse is produced at the output 548 which propagates out through the transmission line 550 and a —1-volt pulse is fed through the coaxial cable 535 to the output 544. Similarly, the 2-volt pulse is divided equally between the output 549 and the output 545 of cable 536. Thus the single pulse on output 527 is again divided into four pulses by the transformer stage 535–536, each pulse having an amplitude equal to one-half of the input amplitude. The pulses on outputs 548 and 549 pass through transmission lines 550 and 560 and all four outputs from transformer stage 535–536 are coupled by capacitors 546, 547, 561 and 562 to the transmission cables 706a–706d, respectively, which also have a 50-ohm characteristic impedance. Thus, it will be noted that at any point between the input cable 519 and the output cables 706a–706d, except at the biasing resistors 590, the impedance in each direction is 50 ohms. However, the biasing resistors 590 are very large. Consequently, there is no reflection of energy in the transformer except at the biasing resistors 590, and this is held to a minimum by the size of the biasing resistors. Each of the other secondary transformer stages 537–538, 539–540, and 541–542 also has four outputs, but the outputs 566, 567, 574, 575, 582 and 583 are not used. However, these outputs are terminated through the respective 50-ohm resistors to ground so as to maintain the necessary matched impedance throughout the transformer network. Of course, it will be appreciated that each of the coaxial transmission lines 706a–706j must ultimately be properly terminated through a 50-ohm resistance so as to prevent the reflection of energy back through the transformer network.

It will also be noted that the pulses do not arrive at the outputs 527, 528, 529 and 530 at the same time because of the propagation delay through the coaxial cables 523 and 525 to the outputs 527 and 530. However, these pulses are nevertheless in a precise known relationship and can be made precisely synchronous by interposing coaxial delay lines of suitable lengths at the outputs 528 and 529. In the particular transformer here illustrated and described, however, the various coaxial cables 706a–706j extend to various components located on one or more printed circuit boards. This requires that a coaxial delay line be used for other purposes, and the length of the delay line is chosen so as to take into consideration the total lengths of the various paths of the pulses through the transformer.

Thus it will be noted that the transformer 705 is capable of deriving up to sixteen pulses which are in precise synchronism with a single input pulse, with a reduction in amplitude of only one-fourth and with no significant loss in power. Further, it will be appreciated that each of the sixteen outputs may be used to drive any desired load so long as the input impedance of the load is 50 ohms (for the example described), and may also be used to drive still another set of transformer stages to produce sixty-four pulses, etc. Since the transformer system is a passive, rather than an active system, the pulses are synchronized with maximum precision. It is also important to note that both the input and outputs of the transformer system may be coaxial transmission lines. Further, the transmformer system is very inexpensive.

An increment counter indicated generally by the reference numeral 708 is comprised of a units feedback register 710 and a tens feedback register 712. The units feedback register 710 overflows into the tens feedback register 712 by the operation of the decade transfer stage $DTS_1$. This transfer occurs when the units register 710 is reset to zero after the count of nine. The increment counter 708 can also be reset after counting any programed number of clock pulses up to one hundred by means of programed digital comparators $PDC-V_1$ and $PDC-V_2$ and feedback reset stage $FRS_1$.

The operation of the increment counter 708 can best be understood by reference to FIGURE 15. The units feedback register 710 is comprised of flip-flop or binary stages $S_1$, $S_2$, $S_3$, $S_4$ and $S_b$ which are connected to count in a quibinary code. Each binary stage has what will be referred to as a true AND gate T and a complement AND gate C, and corresponding true and complementary outputs T and C. When all inputs to gate T are at logic "1" level, the stage switches such that the true output T is at a logic "1" level and the complement output C is at a "0" logic level. Conversely, when all inputs to complement gate C are at logic "1" level, the binary changes states so that the true output T is at "0" logic level and the complement output T is at logic "1" level. A circle at either the input or the output of any logic component indicates that the logic level applied to that point is inverted. The binary stages may also be preset to a logic "1" level, i.e., output T at a logic "1," by the application of a logic "1" level to the preset line P, such as illustrated on stages $S_2$ and $S_b$. A bias is applied through lines 714 to enable this preset function.

The clock source to the complement gates C of stages $S_1$–$S_4$, $S_b$ and $DTS_1$ is provided through line 716 and OR gate 718, the negative clock pulse being converted to a positive pulse by the inverter at the output of OR gate 718. The combination of an OR gate and inverter is sometimes referred to as a NOR gate. The clock pulse is also applied to the true gates T of all stages, including the transfer stage $DTS_1$, through NOR gate 720, which is represented by the OR gate plus the inversion at the output, except when the feedback stage $FRS_1$ is in the logic "1" state for reset purposes as will presently be described. Then if the logic "1" level is present on the input to the NOR gate 720, no clock pulses will be applied to the true input gates T of the binary stages. Thus the clock pulse is applied to the complement gates C of all stages $S_1$–$S_4$, $S_b$ and $DTS_1$ at all times, and the same clock pulse is applied to the true gates T except when disabled at NOR gate 720 by the stage $FRS_1$ being in the "1" state. Each of the stages $S_1$–$S_4$ is automatically reset to the "0" state on the next succeeding clock pulse after being set to the "1" state because the complement output C of each stage is fed back to an input of the complement gate of the stage through an inverter. Then on the next clock pulse, the respective binary stage is returned to the "0" logic state.

Binary stage $S_1$ can be changed from a "0" to a "1" state only when all of binary stages $S_1$, $S_2$, $S_3$ and $S_4$ are in the "0" state because the true output T of each is connected back to the true gate T of stage $S_1$. Binary stage $S_2$ is switched to logic "1" level only on the first clock pulse after stage $S_1$ has switched to the "1" level because the complement output C of stage $S_1$ is connected to an input of true gate T of stage $S_2$. Similarly, $S_3$ can be switched to logic "1" state only on the next clock pulse after $S_2$ has been switched to the "1" state because the complement output of stage $S_2$ is connected to gate T of stage $S_3$. The complement output of stage $S_3$ is also connected to the true gate T of stage $S_4$ so that stage $S_4$ can be switched to the logic "1" state only on the first clock pulse after $S_3$ is switched to the "1" state. The binary stage $S_b$ is switched to the "1" state on the first clock pulse after $S_4$ is switched to the "1" state because the true gate T is connected through an inverter to the complement output of stage $S_4$ and to the true output of stage $S_b$, which will be at "0" logic level when $S_b$ is in the "0" state. However, it will be noted that stage $S_b$ cannot be complemented back to the "0" state unless both stages $S_4$ and $S_b$ are in the "1" state, which condition represents the number nine, because the inputs of the complement gate C of stage $S_b$ are taken from the complement outputs of stages $S_4$ and $S_b$. The line 722 from the true output of $FRS_1$ will be at "0" level except when the increment counter 708 is being reset as will hereafter be described. The decade transfer stage $DTS_1$ is switched from a "0" state to a "1" state on the count of nine because the inputs to the true gate T of $DTS_1$ are connected to the complement outputs of stages $S_3$ and $S_b$ and to the true output of $DTS_1$.

Assume that all binary stages in the units decade 710 are in the "0" state. Only the true gate of stage $S_1$ will then be enabled due to the "0" feedback from the true output of stages $S_1$–$S_4$. On the first clock pulse from gate 720, stage $S_1$ is then switched to logic "1" state. The "0" logic level from the complement output of stage $S_1$ thus enables the complement gate C of stage $S_1$ and the true gate T of stage $S_2$. Then on the next clock pulse, stage $S_1$ is switched back to "0" state and stage $S_2$ is switched to "1" state, thus indicating a count of two. The "0" logic level at the complement output of stage $S_2$ then enables the complement gate C of stage $S_2$ and the true gate T of stage $S_3$ so that on the third clock pulse stage $S_2$ is switched back to "0" state and stage $S_3$ is switched to "1" state. The "0" logic level at the complement output of stage $S_3$ then enables the complement gate C of stage $S_3$ and the true gate T of stage $S_4$ so that the fourth clock pulse switches stage $S_3$ to a "0" state and stage $S_4$ to a "1" state. The logic "0" level on the complement output of stage $S_4$ then enables the complement gate C of stage $S_4$ and also enables both the true and complement gates of the binary stage $S_b$. Since binary stage $S_b$ is in the "0" state, the "0" logic feedback from the true output enables the true gate T and the "1" logic feedback from the complement output disables gate C. Then on the fifth clock pulse, stage 4 returns to "0" state and binary stage $S_b$ switches to the "1" state.

Now since stages $S_1$–$S_4$ are all at "0" state, the true gate T of stage $S_1$ is again enabled due to the feedback from the true outputs of the stages $S_1$–$S_4$ so that on the sixth clock pulse stage $S_1$ is again switched to a logic "1" level. It will be noted that stage $S_b$ is not reset to "0" state at this time because the complement gate C of stage $S_b$ is disabled by the logic "1" feedback from the complement output of stage $S_4$. Stages $S_2$, $S_3$ and $S_4$ are then successively switched from logic "0" to logic "1" on the seventh, eighth and ninth counts and each is reset to zero on the next succeeding count, as heretofore described in connection with counts two, three and four. On the eighth count, however, the "0" logic level at the complement output of stage $S_3$, together with the "0" logic level at the true output of decade transfer stage $DTS_1$ and the "0" logic level of the complement output of the binary stage $S_b$ all enable the true gate T of stage $DTS_1$. Thus on the ninth count, i.e., when stage $S_4$ changes from the "0" to the "1" state, stage $DTS_1$ also switches from a "0" state to a "1" state. Thus stages $S_4$, $S_b$ and $DTS_1$ are all in the "1" state after the count of nine, and then all are reset to "0" state on the tenth count, the switching of stage $S_4$ being enabled by the "0" feedback from the complement output of stage $S_4$, stage $S_b$ being enabled by the "0" level at the complement outputs of both stages $S_4$ and $S_b$, and stage $DTS_1$ being enabled by the "0" level at the complement output of stage $DTS_1$. The decade count is then repeated in the same manner.

The tens feedback register 712 is identical to the units feedback register and also includes stages $S_1$, $S_2$, $S_3$, $S_4$ and $S_b$ which are interconnected in an identical manner. However, the clock pulse to both the true and complement gates T and C of the five stages are gated through to the tens register only when decade transfer stage $DTS_1$ is in the logic "1" state. Thus it will be noted that the negative clock pulse applied to the line 724 is applied to NOR gates 726, 728 and 730. The "0" output of stage $DTS_1$ is connected to NOR gates 726 and 728 so that the NOR gates are disabled whenever the decade transfer stage $DTS_1$ is at the "0" state. Assuming that the feedback reset stage $FRS_1$ is in the "0" state, gates 726 and 728 will not be disabled. Thus when the units feedback register 710 has reached a count of nine and $DTS_1$ is switched to a "1" state, NOR gates 726 and 728 will be enabled so that on the tenth clock pulse the tens feedback register 712 will be incremented one count. Since the decade transfer stage $DTS_1$ is also reset to logic "0" on the tenth pulse, the tens register 712 will again be disabled until the units register next reaches the count of nine. Thus the combination of the units register 710 and the tens register 712 will count from zero to ninety-nine unless reset at a programed number between zero and ninety-nine, as will now be described.

Programed digital comparators $PDC$–$V_1$ and $PDC$–$V_2$ may be programed to reset the units and tens feedback registers 710 and 712, respectively, after any programed count has been reached on the increment counter. Digital comparators $PDC$–$S_1$ and $PDC$–$S_2$ are programed independently of comparators $PDC$–$V_1$ and $PDC$–$V_2$ and may be programed to sense any count of the increment counter as will hereafter be described. Since $PDC$–$S_1$ and $PDC$–$S_2$ operate independently of the reset function of the increment counter, their function will not be described at this time. The complement outputs of stages $S_1$, $S_2$, $S_3$, $S_4$ and $S_b$ are connected through inverters to inputs of gates $D_1$, $D_2$, $D_3$, $D_4$ and $D_5$, respectively. The true outputs of stages $S_1$, $S_2$, $S_3$ and $S_4$ are all connected through inverters to the input of gate $D_0$. The true output of the binary stage $S_b$ is connected to an input of gate $D_B$. A program input line is also connected to each of the gates $D_0$–$D_5$ and $D_B$, each program line being designated by the programed count numbers for which the program line is at a logical "1" level. For all other program numbers, the program lines are at a logical "0" level. When a logical "0" is applied to a program line, the corresponding gate $D_n$ is disabled and has a "0" output regardless of the level of any other input to the gate. When the program line is at a logical "1" level and the input from the associated binary stage is at a logical "1" level, the output of the gate $D_n$ is at a logic "1" level. When the input from the binary stage is a logic "0," the output of the gate $D_n$ is at a logic "0" level. The outputs from gates $D_0$, $D_1$, $D_2$, $D_3$ and $D_4$ are connected to one input of an OR gate 732, and the outputs of gates $D_5$ and $D_B$ are connected to the other input of the OR gate 732. The output from the OR gate 732 is connected through an inverter to an input of true gate T of feedback reset stage $FRS_1$.

Programed digital comparator $PDC$–$V_2$ is identical to comparator $PDC$–$V_1$ and its relationship to the tens feedback register 712 is identical to the relationship of comparator $PDC$–$V_1$ to the units feedback register 710. The OR output gate 734 of $PDC$–$V_2$ is also connected through an inverter to another input of the true gate T of the feedback reset stage $FRS_1$.

The clock pulse to the true gate T of stage $FRS_1$ is gated through NOR gate 736 by a "0" logic level at the true output of $FRS_1$. Similarly, the complement gate C of stage $FRS_1$ is clocked by NOR gate 738 whenever the complement output of stage $FRS_1$ is a "0" logic level. The gate C of $FRS_1$ is also disabled in the special case where the increment counter is programed to be reset on the count of one by means of line 01, as will hereafter be described in greater detail. The output of gate 738 is also connected to preset the binary stage $S_b$ of the tens register 712 to a "0" state and to preset stage $S_2$ to a "1" state as will presently be described.

For purposes of explaining the reset function of the increment counter, assume that the increment counter is programed to reset after the count of twenty-seven. The program lines to gates $D_2$ and $D_5$ of comparator $PDC$–$V_1$ would be brought up to a logic "1" level and the program lines of gates $D_2$ and $D_B$ of comparator $PDC$–$V_2$ would be brought up. The feedback reset stage $FRS_1$ will normally be in the "0" state because the "1" state results in a clock pulse being gated through the preset gate 738 to the complement gate C of $FRS_1$, thus resetting stage $FRS_1$. When the increment counter reaches a count of two, the output of gate $D_2$ will change from a logic "1" to a logic "0." However, since the output of gate $D_5$ is still logic "1," the output of gate 732 remains logic "1."

When the units counter 710 reaches a count of seven, the output of both gates $D_2$ and $D_5$ will be changed to logic "0," and the output of gate 732 will be logic "0." However, the true gate T of $FRS_1$ is still not satisfied since the output from gate 734 of $PDC-V_2$ is still logic "1." When a count of two is reached on the tens register 712, the output of gate $D_2$ of $PDC-V_2$ will change to logic "0." Since the binary stage $S_B$ of the tens register is already in the logic "0" state so that the output from gate $D_B$ is already logic "0," the output from $PDC-V_2$, i.e., the output from gate 734, goes to logic "0." Then when the units register 710 again reaches the count of seven for the third time, the output from $PDC-V_1$, i.e., the output from gate 732, goes to "0" level thus enabling the true input gate T of the feedback reset stage $FRS_1$.

Then on the next clock pulse, $FRS_1$ changes from "0" state to the "1" state. As the complement output of $FRS_1$ goes from logic "1" to logic "0," gates 730 and 738 are enabled, stages $S_B$ and $S_2$ of the tens register 712 are respectively preset to a "0" state and "1" state, and stage $S_B$ of the tens register is preset to "0" state. At the same time, the logic "1" level at the true output of $FRS_1$ disables gate 720. This deprives the true gates T of stages $S_2$ and $S_b$ of the units register of a clock pulse and thereby disables the true gates, and also disables gates 726 and 728 so as to disable the true gates T of all the stages of the tens register 712. Also, the complement gates C of stages $S_2$ and $S_B$ of the units register and the complement gate C of stage $S_B$ of the tens register are disabled. Then on the second clock pulse after the increment counter reaches the programed count, stages $S_1$, $S_3$, $S_4$ of the units counter, stage $DTS_1$, and stages $S_1-S_4$ of the tens register are set to a "0" state through the complement gates C so that the units register will be preset to a count of two, and the tens register 712 will be preset to a count of zero. Thus it will be noted that stage $S_2$ of the units register is preset to a "1" state from gate 738, stage $S_B$ of the units register is preset to a "0" state from gate 738, and stages $S_1$, $S_3$, $S_4$ of the units register and the decade transfer stage $DTS_1$ are set to "0" state, if not already in the "0" state, through gate 718 and the complement gates C. Stages $S_1$, $S_2$, $S_3$ and $S_4$ of the tens register are reset to "0" state, if not already in the "0" state, through gate 730 and the complement gates C, and stage $S_B$ is preset to "0" state through gate 730 and the preset enable line P. On the same clock pulse that the increment counter is preset to a count of two, the feedback reset stage $FRS_1$ returns to the logic "0" state as a result of the feedback from gate 738 to the complement gate C, and the increment counter proceeds to count as heretofore described until the programed count is again reached and the reset function repeated.

Since the reset function requires two clock pulses, the increment counter is reset to the count of two, rather than to zero. Thus it will be appreciated that the increment counter cannot be programed to reset on the count of one. However, the same result is accomplished by disabling the complement gate C of the feedback reset stage $FRS_1$ through program line 01 so that the feedback reset stage $FRS_1$ will remain in the "1" state. Thus when program line 01 is at a logic "1" level, the gate C of $FRS_1$ is disabled. As a result, stage $FRS_1$ will remain in the "1" state so that the increment counter is disabled, and the reference counter, which will presently be described, will be continuously enabled and will count each clock pulse.

When the increment counter is programed to reset on the count of two, $FRS_1$ will complement on every clock pulse so that the reference counter will be incremented on every second clock pulse. Thus when the increment counter reaches the count of two, $FRS_1$ is enabled. On the next clock pulse, $FRS_1$ will change from a "0" state to a "1" state as the increment counter advances to the count of three. Then on the next clock pulse, $FRS_1$ will reset to "0" state, and the increment counter will be reset to the count of two thus again enabling $FRS_1$. $FRS_1$ will again be set to a "1" state as the counter increments to three, then reset to a "0" state as the counter is reset to a count of two. For all other programed reset counts between three and one hundred, which is a 00 program, the operation of the increment counter is as first described.

Referring once again to FIGURES 13a–13c, the reference counter heretofore mentioned is indicated generally by the reference numeral 750 and includes a units decade register 752, a tens decade register 754 and a hundreds feedback register 756. Each of these registers is comprised of five binary stages $S_1-S_4$ and $S_B$ interconnected as heretofore described in connection with registers 710 and 712. The increment counter 708 overflows into the reference counter 750, and in particular overflows into the units decade register 752 by the operation of stage $FRS_2$ which is operated in exact synchronism with feedback reset stage $FRS_1$ and is provided in addition to $FRS_1$ only to furnish the necessary fan-out. The transfer is accomplished by gating the next clock pulse after $FRS_2$ goes to the "1" state through to the true and complement gates of the stages $S_1-S_4$ and $S_B$ of the units register 752. Thus it will be noted that the complement output of stage $FRS_2$ enables gates 758 and 760 when stage $FRS_2$ is in the "1" state so that a clock pulse will be available to operate the stages of the units register 752. Since $FRS_2$ goes to the logic "1" state only on the first count after the increment counter 708 has reached the programed count and then complements back to "0" state on the next clock pulse, the units decade register 752 is enabled for only one count, the count being made on the same clock pulse that the increment counter is preset to the count of two. The units decade register 752 is not programable and always increments through a full ten counts before automatically resetting to a count of zero.

The units decade register 752 overflows into the tens decade register 754, which is identical to the units decade register 752, by operation of a decade transfer stage $DTS_2$. Stage $DTS_2$ operates generally in the same manner as $DST_1$ heretofore described. However, except when the increment counter is bypassed by programing a count of one, the true gate T of $DTS_2$ is enabled from the complement outputs of stages $S_4$ and $S_B$ through gate 762, rather than from stages $S_3$ and $S_B$ as in the case of $DTS_1$, because the counter is counting at a rate less than the reference clock pulse train. When a reset count of one is programed, the true gate T of $DTS_2$ is enabled from the complement outputs of stages $S_3$ and $S_4$ through gate 780, as hereafter described, because the counter 752 is then counting each pulse of the reference clock. The outputs of the program digital comparators $PDC-V_1$ and $PDC-V_2$ together with the clock pulse from gate 762 then set the decade transfer stage $DTS_2$ to a logic "1" state on the same clock pulse that $FRS_1$ and $FRS_2$ are set to the logic "1" state to enable gates 764 and 766. Then on the next clock pulse, i.e., when the increment counter 708 is preset to the count of two, the units decade register 752 is reset to the count of zero, and the tens decade register 754 is incremented one count by the clock pulse gated through gates 764 and 766.

This procedure is repeated until the tens decade register 754 reaches a count of nine, then the tens decade register 754 overflows into the hundreds feedback register 756 by means of decade transfer stage $DTS_3$. This enables gates 770 and 772 so that a clock pulse is gated through to the true and complement gates of the five binary stages of the hundreds decade 756 which is the same as the tens feedback register 712. The hundreds decade 756 then increments one count as stage $DTS_3$ resets to "0" state. This is accomplished when the programed count on the increment counter is reached so that the outputs of $PDC-V_1$ and $PDC-V_2$ go to logic "0," and when the units decade register 752 reaches a count of nine so that the output from gate 762 goes to a logic "1," and when the tens decade register 754 reaches a nine count so that the output of OR gate 768 goes to a logic "1," because $DTS_3$ is already in the logic "0" state. Of course, $FRS_2$, $DTS_2$ and $DTS_3$ are all automatically reset on the first clock pulse after being set to the logic "1" state since each is steered from the zero output through an inverter, the clock pulse to the complementary gates C of $FRS_2$ and $DTS_2$ being provided through gate 774, and the clock pulse to the complement gate C of $DTS_3$ being provided through gate 776.

The hundreds feedback register 756 may be reset after any programed count between zero and nine by means of a feedback reset stage $FRS_3$ and a programed digital comparator $PDC-V_3$ which operate in the same manner as the programed digital comparators $PDC-V_1$ and $PDC-V_2$ and the feedback reset stage $FRS_1$ heretofore described. Thus when the hundreds feedback register 756 reaches the count programed in the comparator $PDC-V_3$, the output of the comparator goes to logical "0" and this is applied to one input of gate T of the feedback reset stage $FRS_3$. Then when the units feedback register 710 reaches the programed count of $PDC-V_1$, the tens feedback register 712 reaches the programed count of $PDC-V_2$, the units decade 752 reaches a nine count, and the tens decade register 754 reaches a nine count, $FRS_3$ is set to a logic "1" state. The true output of $FRS_3$ is connected to gate 770 and the logic "1" level disables gate 770 so that the true gates T of the five stages of the hundreds feedback register are denied a clock pulse. Since $DTS_3$ is also set to the "1" state at the same time as stage $FRS_3$, the complement gates C of the binary stages of the hundreds feedback register 756 are provided with a clock pulse through gate 772. Since the binary stage $S_B$ of the hundreds feedback register 756 may be in either the "0" or "1" state, it is preset to a "0" level from the complement output of stage $FRS_3$.

From the above, it will be noted that the increment counter 708 can be programed to sense any count from one to one hundred before resetting the increment counter and incrementing the units decade register 752 of the reference counter 750. It will be recalled that when programed to count only one clock pulse, the complement gates C of stages $FRS_1$ and $FRS_2$ are disabled by bringing program line 01 up to logic "1" level so that binary stages $FRS_1$ and $FRS_2$ remain in the logic "1" state. Then the units decade register 752 of the reference counter counts each of the clock pulses from the source 702. When operating in such a condition, data transfer stage $DTS_2$ must be enabled when the units decade register 752 reaches a count of eight, rather than a count of nine, in the same manner as stage $DTS_1$ of increment counter 708 to prevent losing a count. Thus program line 01 is connected to disable gate 762 when at a logic "1" level. Program line $\overline{01}$ is at a logic "1" level for all reset counts other than the 01 count so that gate 780 is disabled, but when the $\overline{01}$ line is at logic "0" level, gate 780 is enabled so that $DTS_2$ is enabled on the eight count (rather than the nine count), set to logic "1" state on the nine count, and reset to "0" state on the transfer count.

The hundreds feedback register 756 may be bypassed by programing line 782 to a logic "1" to disable gate 770. This deprives the true gates T of the five binary stages of a clock pulse so that the hundreds decade 756 remains at the preset count of zero. Then $PDC-V_3$ is programed to provide a continuous output which enables the true input gate T of $FRS_3$ so that $FRS_3$ complements when $DTS_3$ complements, thus effectively bypassing the hundreds feedback register 756.

The reference clock pulse train is taken directly from the clock pulse shaper and transformer 704 by means of an inverting gate 790.

The reset clock pulse train is produced at the output of gate 792 so that a reset clock pulse is produced on the first clock pulse after stage $FRS_3$ has changed to a logic "1" state. It will be noted that this point in time is two clock pulses after comparators $PDC-V_1$, $PDC-V_2$ and $PDC-V_3$, and gates 762 or 780 and 768 have all been satisfied and therefore occurs on the same clock pulse that the increment counter 708 is reset to a count of two and the reference counter 750 is reset to a count of zero.

The variable clock pulse train is produced at the output of gate 794 and may be selected to occur on the first clock pulse after either $FRS_2$, $DTS_2$, $DTS_3$, or $FRS_3$ changes to a logic "1" level by bringing the range program lines $VR_1$, $VR_2$, $VR_3$ or $VR_4$, respectively, up to logic "1" level to enable either gate 795, 796, 797 or 798, respectively. Thus when the output of any one of the gates 795–798 changes to a logic "1" level, the output of gate 800 changes to a "0" level so that the next negative clock pulse results in a positive pulse out of NOR gate 794. Since the variable clock pulses are taken from the binary stages which change to a logical "1" state in synchronism with stage $FRS_3$, from which the reset clock is taken, a variable clock pulse will be produced in precise synchronism with the reset clock pulse, and subsequent variable clock pulses will occur at intervals thereafter determined by the selected range. If range $R_1$ is selected, the variable clock will occur at a rate of from every reference clock pulse up to one hundred reference clock pulses, depending upon the reset count programed into the increment counter. Range $R_2$ increases the increment period between the variable clock pulses by ten as a result of the operation of the units decade register 752, and range $R_3$ increases the increment period by one hundred as a result of the tens decade register 754. Range $R_4$ results in a variable clock pulse train occurring in synchronism with and at the same frequency as the reset clock pulse train from gate 792.

A sample clock pulse is derived once, and only once, during each period defined by two successive reset clock pulses. This is accomplished by means of five programed digital comparators $PDC-S_1$, $PDC-S_2$, $PDC-S_3$, $PDC-S_4$ and $PDC-C_5$ which are connected to sense the count on registers 710, 712, 752, 754 and 756, respectively. The programed digital comparators $PDC-S_1$–$PDC-S_5$ are identical to the programed digital comparators $PDC-V_1$–$PDC-V_3$. When each register reaches the count programed in the respective digital comparator, the output from the digital comparator goes to logical "0."

It is important to note that the sample clock may be programed to occur on any clock pulse during each period defined by successive reset clock pulses. The sample clock pulses may be derived either from NOR gate 804 or NOR gate 806. For all cases other than when the programed period ends in 01, i.e., is XXX01, program line 808 is at a logic "1" level so that gate 806 is disabled. Program line 810 is at a "0" level so that true gate T of the sample clock delay stage SDS is not disabled. Then whenever the increment counter reaches the count programed in $PDS_1$ and $PDS_2$, SDS is enabled. Then on the next clock pulse, SDS changes to logic "1" state in synchronism with stage $FRS_3$, and the complement output of delay stage SDS enables gate 804. Thus if the outputs of $PDC-S_3$, $PDC-S_4$ and $PDC-S_5$, which are connected to the inputs of gate 814, are at "0" logic level, a sample clock pulse will be produced from the gate 804 on the first reference clock pulse following the change of SDS to logic "1" state. It will be noted that the delay stage SDS provides a one count delay corresponding to the one count delay caused by the stage $FRS_2$ so that each sample clock pulse will be properly oriented in time with respect to each reset clock pulse. However, when the increment counter is operated in the 01 program mode, i. e., when the increment counter is bypassed, the units decade register 752 counts each reference pulse so that this one count delay is no longer present. For this reason the program line 810 is changed to logic "1" level to disable delay stage SDS, and gate 812 is enabled by changing the logic "1" on program line 808 to a logic "0" and bypass delay stage SDS.

The delayed clock pulse train is produced at the output of either gate 816 or 818. When program line DR-00 is at "0" logic level, indicating a zero time delay, the output of gate 800 of the variable clock source is gated through gate 816 so that the pulses of the delay clock pulse train occur in precise synchronism and at the same frequency as the pulses of the variable clock pulse train. However, the pulses of the delay clock pulse train may be selectively programed to occur at a large number of different delay periods after the variable clock pulse by means of a delay counter indicated generally by the reference numeral 820 and programable ranges.

The delayed counter 820 is substatnially identical to the increment counter 708 and includes a units feedback register 822 and a tens feedback register 824 which are substantially identical to registers 710 and 712, respectively. The units feedback register 822 overflows into the tens feedback register 824 by operation of a decade transfer stage $DTS_4$. The count of the units feedback register is sensed by programed digital comparator $PDC-D_1$, and the count on the tens feedback register 824 is sensed by programed digital comparator $PDC-D_2$. When the count in the respective registers reaches the count programed in the respective comparators, the outputs from the digital comparators $PDC-D_1$ and $PDC-D_2$ go to logic "0" as heretofore described and these outputs enable a feedback reset stage $FRS_4$ which is used to reset the units and tens registers 822 and 824.

The delayed counter may count on any one of three ranges. When program line DR-1 is at a logic "1" level, this together with a steady state logic "0" on line 826 from a suitable source causes the output of NAND gate 828 to go to logic "0" so that the output of gate 830 goes to "0" and all reference clock pulses are gated through gates 832 and 834 to the true and complement gates of the binary stages of the units feedback register when $FRS_4$ is in the "0" state as will presently be described. If program line DR-2 is at a logic "1" level, then gate 836 causes the output of gate 830 to go to logic "0" only when $FRS_2$ is at logic "1" level, so that the delayed counter 820 counts the overflow from the increment counter. This permits the period for each count of the delayed counter to be programed from one to ninety-nine merely by programing the increment counter. The count period of the delayed counter can be increased by a factor of ten by raising program line DR-3 to a logic "1" so that gate 838 will cause gate 830 to go to logic "0" when $DTS_2$ goes to a logic "1" state. The output from gate 830 is also connected to gate 840 which performs a reset function as will presently be described, and to gates 842 and 844 which gate clock pulses to the tens feedback register 824. Gate 846 enables stage $FRS_4$ to be set to a logic "1" state. Gate 848 is used to reset the tens feedback register 824 as will presently be described.

The feedback reset stage $FRS_4$ determines whether the delayed counted is in the count mode or in the preset mode. When $FRS_4$ is in the "0" state, the delayed counter operates in the count mode because the logic "0" level of the true output of $FRS_4$ enables gates 832, 842 and 844. The units feedback register 822 then proceeds to count the clock pulses through gate 832, the rate of the clock pulses depending, as previously described, upon the range selected by program lines DR-1, DR-2 and DR-3. When the units feedback register 822 reaches the count of eight, decade transfer stage $DTS_4$ is enabled. Then on the ninth clock pulse, stage $DTS_4$ is switched from a "0" state to a "1" state. Then on the tenth clock pulse through gate 832, the units feedback register 822 is reset to a count of zero, the tens feedback register 824 is incremented one count, and $DTS_4$ returns to the "0" state. This procedure is repeated until the count programed in the comparators $PDS-D_1$ and $PDC-D_2$ is disabled by a logic "1" level at the true output of stage reached, at which time stage $FRS_4$ is switched from a "0" state to a "1" state, provided gates T and C of $FRS_4$ are not disabled by a logic "1" level at the true output of stage $FRS_3$ for purposes which will presently be described. After $FRS_4$ has switched to a "1" state, the logic "1" level at the true output of $FRS_4$ disables the gates C of stages $S_1$ and $S_B$ of the units register 822, and disables gates 832 and 846, the latter gate disabling both the reset function and the true gate T of $FRS_4$. The logic "1" level at the true output of $FRS_4$ also disables gates 842 and 844. On the other hand, the complement output of $FRS_4$, which is at "0" logic level, enables the preset of stage $S_B$ of the tens feedback register 824 so that the stage is preset to zero, enables gate 848 so that the succeeding reference clock pulses will reset the first four stages $S_1$–$S_4$ of the tens feedback register 824 to zero, and enables gate 840 for purposes which will presently be described.

The count period for the delayed clock counter is initiated by a variable clock pulse. Thus when the output of gate 800 goes to logic "0," the variable clock gate 794 is enabled and the complement gate C of $FRS_4$ is enabled, assuming that $FRS_3$ is in the logic "0" state. Then $FRS_4$ is set to the "0" state when all inputs to gate 840 go to logic "0." This occurs when the output from range gate 830 goes to logic "0," and when the reference clock goes to logic "0," assuming that $FRS_4$ is already in the "1" state. Thus on the next clock pulse (either the high speed reference clock pulse or the clock pulse selected by the range gates 830), $FRS_4$ is changed to the "0" state thereby enabling gates 832, 842 and 844 and the units feedback register 822 proceeds on the count of two, the first count being lost as the feedback stage $FRS_4$ was set to the "0" state.

Gates 840 and 848 are disabled when $FRS_4$ is in the logic "1" state. When $FRS_4$ is changed to a logic "0" state, gate 840 is enabled so that the reset and the true gate T of $FRS_4$ are both enabled. The delayed counter 820 proceeds to count until the programed count is reached at which time the outputs of $PDC-D_1$ and $PDC-D_2$ go to logic "0." Since $FRS_4$ is in the logic "0" state, gate 818 is enabled when the output of gate 830 goes to a logic "1" level so that the next reference clock pulse will be gated out from gate 818. On the same clock pulse, since the true input gate T of $FRS_4$ is also enabled by the output from gate 830, $FRS_4$ is also switched to a logic "1" state thereby disabling gate 818 and disabling the delayed counter 820. On the next clock pulse after feedback stage $FRS_4$ has switched to the logic "1" state, the delayed counter is preset to a count of one, and both $FRS_4$ and the delayed counter remain in this state until $FRS_4$ is set to the "0" state by a pulse from gate 800 of the variable clock, at which time the delayed counter again begins to count.

If desired the feedback reset stage $FRS_4$ may also be set to a logic "1" state to present the delayed counter 820 whenever $FRS_3$ is switched from a logic "0" to a logic "1" state preparatory to producing a reset clock pulse. This may be accomplished by the connections indicated in dotted line. Then the complement output of $FRS_3$ will enable the reset function and the true output of $FRS_3$ will disable the T and C gates of $FRS_4$ so that $FRS_4$ will be preset to a "1" state in synchronism with the reset clock pulse from gate 792. However, since $FRS_4$ cannot be set to a "0" state, this results in the delayed counter being disabled during the period between the reset clock pulse and the first variable clock pulse after the reset clock pulse which again starts the count on the delay counter.

It will also be noted that when a zero time delay period is programed, program line DR-00 disables gate 840 so that $FRS_4$ cannot be switched to the "0" state, i.e., the count enable mode. The true output of $FRS_4$ then disables gate 818 to prevent spurious delayed clock pulses. If no count between zero and ninety-nine is programed on PDC–D₁ and PDC–D₂, the delay counter will stop on the count of ninety-nine with stage FRS₄ in the "0" state and no delayed clock pulse train will be produced.

Although any of the clock pulses may be used to synchronize either of the pulse generators I or II, the variable clock pulses 306 will customarily be used to initiate a test pulse as represented by the rise 312 of the waveform 314. The fall 316 of the test pulse may be determined either by the delay clock 308 or by a counter in the respective pulse generators operated by the 100 megacycle clock 302.

The sample clock from the digital synchronization system 300 is applied to a sample clock pulse generator 318 which produces a pulse suitable for triggering the sampling system. The sample clock pulse opens a normally closed electronic switch 320 of a fast ramp generator indicated generally by the reference numeral 322. The fast ramp generator 322 is comprised generally of a current source 324 which is connected to charge one of four capacitors 326–329 through one of four resistors 331–334, depending upon which of four electronic switches 337–340 is closed in response to programed range information. The capacitors may be selected to provide a fast ramp of different slope. Also, the current into the resistors and capacitors may be varied by turning a transistor 342 "on" which acts as a current source and shunts a portion of the current flow from the source 324 to ground. This is accomplished by reducing the potential at the base of a switch transistor 344 so as to lower the potential of the emitter of the transistor 342.

When the switch 320 is closed, as is normally the case, the output conductor 346 is at some low potential. However, when the switch 320 is opened by the pulse from the sample clock pulse generator 318, the voltage builds as one of the capacitors 326–329 is charged, depending upon which of the switches 337–340 is closed, to produce a linear fast ramp 350 as illustrated in FIGURE 7.

The output 346 is connected to one input of a comparator amplifier 354. The other input to the amplifier 354 is connected to the output of a high input impedance amplifier 356. When the voltage of the output conductor 346 exceeds the voltage at the output of amplifier 356, the change in voltage at the output of amplifier 354 is fed back by conductor 352 to again close the switch 320 and quickly discharge the capacitor, thereby returning the voltage at the output 346 to its initial low level.

The amplifier 356 has an adjustable gain and adjustable offset for calibration purposes. The input to the amplifier 356 is derived from a staircase ladder network 358 through a resistor 360. The staircase ladder network provides a large number of selectable voltage levels in equal increments between two limits. For example, in the embodiment of the invention here being described, the staircase ladder provides four thousand equal voltage increments between −2.0 volts and +2.0 volts. The staircase ladder network may be selectively set at any one of the voltage increments by a logic interface designated staircase control 362. The staircase control 362 essentially has two modes of operation, one being the reference mode during which any one of the four thousand voltage levels is generated, and the other being the count mode. In the count mode, the staircase ladder network is successively stepped in cadence to the low speed logic clock, which is derived from the sample clock as is hereafter described, through equal increments as a result of the operation of a staircase counter 364.

The staircase counter 364 is comprised of a units, a tens, a hundreds and a thousands decade, although the thousands decade only counts from zero to three in order to provide four thousand total counts. The counter 364 is connected by the staircase control 362 to step the staircase voltage one voltage unit for each count, a unit being 1 millivolt. However, for purposes which will hereafter be described in connection with the interlace scan, each low speed logic clock pulse increments the tens decade, rather than the units decade, and the tens decade overflows into the hundreds decade, which overflows into the thousands decade to produce a count of 400 (from 0–399). As a result, the staircase voltage is increased by an increment of ten millivolts for each low speed clock pulse. Then the thousands decade overflows into the units decade and the 400 counts are repeated but each step is 1 millivolt greater than the corresponding step of the previous staircase produced by the preceding 400 steps. The following table, based on a voltage range from −2.0 volts to +2.0 volts and 4,000 increments will serve to illustrate the output of the staircase ladder network when operated in the count mode for the ten interlace scans IS–1 through IS–10.

STAIRCASE VOLTAGES IN COUNT MODE FOR INTERLACE SCANS

|  | IS–1 | IS–2 | - - - - | IS–9 | IS–10 |
|---|---|---|---|---|---|
| Step 1 | −2.000 | −1.999 |  | −1.992 | −1.991 |
| Step 2 | −1.990 | −1.989 |  | −1.982 | −1.981 |
| Step 3 | −1.980 | −1.979 |  | −1.972 | −1.971 |
| Step k |  |  |  |  |  |
| Step 397 | +1.970 | +1.971 |  | +1.978 | +1.979 |
| Step 398 | +1.980 | +1.981 |  | +1.988 | +1.989 |
| Step 399 | +1.990 | +1.991 |  | +1.998 | +1.999 |

The staircase voltage at the output of the amplifier 356 is represented by the voltage time line 370 in FIGURE 7, with the dotted line 372 representing the level at which no output is produced by the comparator 354. The D.C. offset voltage of the amplifier 356 is adjusted such that when the staircase ladder network is at the lowest voltage and the switch 320 is closed, no output is produced by the comparator 354. However, as soon as the fast ramp 350 exceeds the staircase voltage by an infinitesimal amount, an output is produced by the comparator 354 sufficient to trigger a pulse generator 374. The pulse generator 374 has three outputs, one of which drives a strobe pulse generator 376 which produces a strobe pulse, indicated by the time line 380 in FIGURE 7, which is used to momentarily close a sampling bridge switch 378. Thus, the strobe pulses occur when the fast ramp voltage 350 exceeds the staircase voltage 370. When the staircase voltage is at the lowest level represented by the dotted line 372, the strobe pulse 380I occurs substantially in synchronism with the sample clock pulse 310I. But as the staircase voltage increases, strobe pulse 380II is delayed by a time interval equal to the time it takes for the fast ramp voltage to exceed the staircase voltage.

An output from the pulse generator 374 also drives the low speed clock pulse generator 382 which produces a pulse delayed a very short period of time behind the strobe pulse as indicated by the time line 384. The low speed clock 384 provides the cadence for the dynamic measuring system as will hereafter be described, and in particular operates the staircase counter 364 so that the voltage from the staircase ladder network is stepped up in synchronism with the low speed clock 384 as indicated at 370a and 370b. The low speed clock pulse generator 382 also drives a reset clock generator 386 which produces a low speed reset clock represented by the time line 388 and having successive pulses 388I and 388II. The low speed reset clock is used to reset the staircase counter 364 between any two successive low speed clock pulses as represented by the dotted line 387. This permits the use of the staircase counter for certain other control functions which will hereafter be described in greater detail.

As previously mentioned, the sixteen leads L₁–L₁₆ may be selectively connected to one of the four probe connectors P₁–P₄ by closing the appropriate relays L$_n$R₁ and L$_n$R₃. The connectors P₁–P₄ are at the ends of cables CC₁–CC₄, respectively, which are connected to the inputs of sampling bridges 378a–378d, respectively. The four sampling bridges 378a–378d are each operated by separate strobe pulse generators 376a–376d, all of which are operated by the pulse generator 374.

When a sampling bridge 378 is closed by the pulses from the strobe pulse generator for a period on the order of a 0.5 nanosecond, the capacitor 392 assumes a charge between the existing voltage on the capacitor plus some percentage of the difference between the voltage at the particular lead $L_n$ and the existing voltage on the capacitor 392. The voltage on the capacitor 392 is passed through a unity voltage gain high input impedance amplifier 394 and the multiplex unit 396 to input #1 of a high gain, high input impedance comparator amplifier 400. As used herein, a high input impedance amplifier is meant to be an amplifier having a high input impedance as compared to its output impedance. The output from the amplifier 400 is connectable through a normally open electronic switch 402 to charge a capacitor 404, and is connectable through a normally closed electronic switch 406 to charge a capacitor 408. The normally open switch 402 is closed and the normally closed switch 406 opened in synchronism with the closing of the sampling bridge 378 for 1.0 microsecond by a 1.0 microsecond pulse from a single shot pulse generator 410 which is triggered by an output from the pulse generator 374. The voltage on the capacitor 404 is applied to the input of a high impedance, unity gain amplifier 412, and the voltage on the capacitor 408 is applied to the input of an identical amplifier 414. The outputs of the amplifiers 412 and 414 are interconnected by a variable voltage divider 416, the sliding contact of which is connected by conductor 418 to the second input of the comparator amplifier 400. The output of the amplifier 412 is also connected by a conductor 420 back to each of the strobe pulse generators so as to establish the proper reverse bias level for the sampling bridge, and is connected through resistors 422 and four coaxial cables 424 to charge the four input capacitors 392 for purposes which will presently be described in greater detail.

When one of the sampling bridges 378 is closed for a very short duration, for example about 0.5 nanosecond, some percentage of the difference in voltage at the device lead and the voltage stored on the capacitor 392 will be added to the capacitor 392, the percentage being defined as the sampling efficiency of the bridge. For example, if the charge on the capacitor 392 is 1.0 volt and 2.0 volts is present at the device lead, the voltage at the capacitor 392 would be 1.5 volts after the sampling bridge has momentarily closed and then opened, assuming a 50% sampling efficiency. The purpose of the sampling system just described is to produce a voltage at the output of the unity gain impedance amplifier 412 equal to the voltage at the input of the sampling bridge when the bridge is momentarily closed. This is accomplished as follows.

Simultaneously with the closing of the sampling bridge 378, the normally open switch 402 closes and the normally closed switch 406 opens, and this condition persists for approximately 1.0 microsecond. Assume that as the sampling bridge 378 is closed three times in succession, the voltage at the input of the bridge is a positive 1.0, 2.0 and 3.0 volts, respectively. Also assume for ease of illustration that the sampling efficiency of the bridge is 50% and that the initial voltage charge stored on each of the capacitors 392, 404 and 408 is 0.0 volt. After the sampling bridge 378 has closed momentarily, the capacitor 392 will be charged to 0.5 volt. The unity gain amplifier 394 applies the 0.5 volt to the first input of the high gain operational amplifier 400. Since the switch 402 is closed and the switch 406 is open, the capacitor 404 is quickly charged by the high output of the amplifier 400 because the initial feedback through conductor 418 to the second input of the amplifier 400 is 0.0 volt. The capacitor 404 is charged until the voltage at the output of the unity gain amplifier 412 is sufficient to raise the voltage at the second input of the amplifier 400 to 0.5 volt. Since the sliding contact on the variable resistor 416 is set at 50%, and since the charge on the capacitor 408 is 0.0 volt, the output voltage at the amplifier 412, and hence the charge on the capacitor 404, must reach 1.0 volt before the amplifier 400 is balanced and charging of the capacitor 404 ceases. This condition occurs during the period when the switch 402 is closed and the switch 406 is open. The time constant of resistor 422 and capacitor 392 is sufficiently long that the change in the voltage on capacitor 392 is of no consequence during the period while switch 402 is closed, and any such change appears as an increase in sampling efficiency of the sampling bridge and can be compensated by adjusting resistor 416.

After switch 402 opens and switch 406 closes, the capacitor 392 is charged up to 1.0 volt over a period of about 9.0 microseconds and the capacitor 408 follows the charging of capacitor 392 as a result of the imbalance at the inputs of amplifier 400 until the charge on all three capacitors 392, 404 and 408 is 1.0 volt, which was the presumed voltage at the device lead.

When the sampling bridge 378 next closes, the input voltage is assumed to be 2.0 volts. The voltage on the capacitor 392 is 1.0 volt due to the previous sample. When the sampling bridge again opens, the charge on the capacitor 392 will have been increased to 1.5 volts, or 50% of the level between the input voltage to the bridge and the voltage on the capacitor 392 before the sample, due to the 50% sampling efficiency presumed for the bridge. The 1.5 volts is passed through the unity gain amplifier 394 and the multiplexer 396 to the first input of the amplifier 400. Since 1.0 volt is fed back to the second input of the amplifier 400 by conductor 418, the capacitor 404 is first charged by the output until the feedback through the amplifier 412 and the voltage divider 416 rebalances the amplifier 400, because switch 402 is closed and switch 406 is open. In order for the voltage at the second input of the amplifier 400 to be 1.5 volts, the voltage at the output of the amplifier 412 must be 2.0 volts because the voltage at the output of the amplifier 414 is 1.0 volt and the voltage divider 416 is set at 50%. Thus, the 2.0 volts at the output of the amplifier 412 is the same as the 2.0 volts at the input to the sampling bridge. After switch 402 opens and switch 406 closes, the 2.0 volts at the output of amplifier 412 is again transferred through the coaxial cable 424 and resistor 422 to charge the capacitor 392 and thus capacitor 408 to 2.0 volts so as to again balance the amplifier 400.

It should be noted that any D.C. offset voltage errors in the sampling system are ultimately stored on capacitor 408 and therefore no significant errors appear in the output of amplifier 412. Further, the high gain of the amplifier 400, which may be on the order of 20,000, makes any offset voltage errors in the switches 402 and 406 or in the amplifiers 412 and 414 negligible when compared to the measuring capabilities of the system. Thus, the output voltage from the amplifier 412 is always equal to the voltage at the input of the sampling bridge at the time the sampling bridge switch is closed.

When operating in the scan mode, the sampling system reproduces the waveform at the device lead by a stair step approximation, but at a much lower frequency. Assume that two successive reset clock pulses are represented at 304I and 304II. Then the first, second and third variable clock pulses 306a, 306b and 306c occur on predetermined 100 megacycle clock pulses after the occurrence of each reset clock pulse 304I and 304II. Assume also that the variable clock pulses 306a, 306b and 306c are used to initiate the rise of test pulses 314a, 314b and 314c and that the corresponding delay clock pulses 308a, 308b and 308c are used to initiate the fall of the test pulses. Each of the test pulses 314a, 314b and 314c is thus oriented in precise relationship to the preceding reset clock pulses 304I or 304II. Assume also that this train of test pulses appears as illustrated in FIGURE 10 at an input lead of the device under test. A complementary waveform comprised of a pulse train represented by the time line 315, such as might be produced at an output lead of the device as a result of the input stimulus, is also illustrated, but this waveform will not now be discussed. Assume also that the sample clock pulses 310I and 310II are programed to occur between the first and second test pulses 314a and 314b after each reset clock pulse, and that the fast ramp generator is set such that the fast ramp voltage 350I and 350II, which start at $T_0$ in synchronism with the sample clock pulses 310I and 310II, and after the fall of the third test pulse 314c. Since each sample clock pulse 310 occurs precisely the same number of 100 mc. clock pulses after each reset clock pulse 304, and since each successive variable clock pulse is also referenced to the preceding reset pulse, the point $T_0$ will occur at the same relative position with respect to the second and third test pulses 314b and 314c during each of the periods I, II, etc. defined by the reset clock pulses 304I and 304II. It will be appreciated that there may be several thousand variable clock pulses 306 between each two reset clock pulses 304, but only one sample clock pulse.

When operating in the scan mode, the staircase ladder network is operated in the count mode to produce a series of ten staircase voltage ramps heretofore described. At time $T_0$, the output from the amplifier 356 will be at the reference potential and the strobe pulse will occur essentially at time $T_0$, the sampling bridge 378 will momentarily close, and the voltage at the output of a sampling system will be equal to the voltage of the sampled waveform 314 at time $T_0$. Just after the sample, the low speed logic clock 384 actuates the staircase counter which increases the staircase voltage by ten millivolts as heretofore described. As a result, the second fast ramp pulse 350II does not exceed the staircase voltage until a point in time $1/400$ of the time period of the fast ramp after $T_0$, or at time $T_{10}$, on the test pulses 314b and 314c following the second reset pulse 304II. Similarly, succeeding strobe pulses are each delayed by $1/400$ of the ramp period so that samples are taken at $T_{20}$, $T_{30}$, etc., up to $T_{3990}$ on the pulses 314b and 314c occurring during successive reset clock periods. As a result, the waveform within the period $T_1$–$T_{4000}$ is reproduced at the output of amplifier 412, but at a much slower frequency equal to $1/400$ of the frequency of the reset clock, which in turn is merely a fraction of the frequency of the variable clock and hence of the test pulse train 314. This scan constitutes interlace scan IS–1. During interlace scan IS–2, the procedure is repeated except that because each ten millivolt stair step level of the staircase voltage is 1.0 millivolt higher than corresponding stair steps during IS– 1, the samples are taken at times $T_1$, $T_{11}$, $T_{21}$, etc. During the third interlace scan, the samples are taken at times $T_2$, $T_{12}$, $T_{22}$, etc., until ten interlace scans are completed for purposes which will hereafter be described in greater detail.

The sampling system may also be operated in such a manner as to repeatedly sample the test waveform 314 at any point between $T_0$ and $T_{4000}$ during each fast ramp voltage. Of course, since $T_0$ is variable to any 100 mc. clock pulse by programing the sample clock, the test waveform 314 may be sampled at any point. This is accomplished merely by programing the staircase ladder network 358 to continuously produce a static voltage at a level corresponding to the particular time $T_n$ of interest during the field-of-view defined by the fast ramp, i.e., $T_0$–$T_{4000}$. As a result, the successive strobe pulses 380 are generated at the same time during each reset period and all samples are taken at the same time $T_n$ on each of the sampled repetitive pulses of the test waveform.

Provision is also made to selectively transfer the voltage at the output of the staircase ladder network 358 to the output of the sampling system for reference purposes, which is referred to as the reference mode. This is true whether the staircase ladder network is operating in the count mode or steady state program mode. The output from the staircase ladder network 358 is connected through resistors 425 and 426 to the input of a high impedance, unity gain amplifier 428 which is connected through a pair of resistors 429 and 430 to the output of impedance amplifier 412. The resistors 429 and 430 form a voltage divider and the junction 431 is the output of the sampling system. A pair of electronic switches 432 and 433 are provided to isolate the staircase voltage from the amplifier 428 and hence from the output 431 by grounding the input of the amplifier 428 when closed. The switches 432 and 433 are operated complementary to the switch 373 and to the ground probe switches $L_nR_1$, $L_nR_2$ and $L_nR_3$.

When the system is operating in the sample mode, either for scanning or for sampling at a selected point in time, switches 432 and 433 are closed and switch 373 is open. However, when the system is operating in the reference mode, the switches 432 and 433 are open and the switch 373 is closed to ground the input to amplifier 356, and in addition all of the switches $L_nR_1$ at the test station are open and the switches $L_nR_2$ and $L_nR_3$ are closed to ground all dynamic sensing probes to ensure that the inputs to the sampling bridges 378 will be at ground and that capacitors 404 and 408 will store a ground reference voltage. The staircase ladder network 358 may then be used to supply any of the four thousand reference voltages between $-2.000$ volts and $+2.000$ volts to the output 431 for normalization, i.e., reference purposes, or may supply the ten successive staircase voltages produced when operating in the count mode in order to measure amplitudes as will hereafter be described.

The output 431 of the sampling system is connected to input #1 of a comparator amplifier 434 of a reference and comparison system. The output of the amplifier 434 is connectable through a pair of switches 435 and 436 and diodes 438 and 440 to charge a capacitor memory M–II. The output of the amplifier 434 is also connectable by switches 444 and 446 through diodes 448 and 450 to charge a capacitor memory M–I. The voltage on the memory M–II is applied to the input of the high impedance, unity gain amplifier 454 and the output of the amplifier 454 is applied to the 100% terminal of a percent digital-to-analog converter 456 which is a programable voltage divider ladder network as will hereafter be described in detail. The voltage on the memory M–I is applied to the input of a high impedance, unity gain amplifier 458 and the output of the amplifier is applied to the 0% terminal of the DAC 456. The output 460 of the DAC 456 is connected to input #2 of the comparator amplifier 434. Thus if the percent DAC 456 is programed at 0%, the voltage on memory M–I is applied to input #2 of the comparator amplifier 434. If 100% is programed, the voltage stored on the memory M–II is applied to the input #2 of the comparator amplifier 434. Any percent between 0% and 100% can also be programed in which case a voltage equal to the voltage stored on memory M–I plus the programed percent of the difference between the voltage stored on memory M–II and the voltage stored on memory M–I will be applied to the second input of the comparator amplifier 434.

Whenever the voltage applied to input #1 of the comparator amplifier 434 exceeds the voltage fed back from the percent DAC 456 at the second input and switches 435, 436, 444 and 446 are open, the gain of the amplifier 434 together with the gain of the high impedance, high gain amplifier 462 is sufficient to change the output of the amplifier 462 from a "0" logic level of 0.0 volt to a "1" logic level of $+4.0$ volts.

Assume now that it is desired to store the voltage level applied to input #1 of the comparator amplifier 434 on capacitor memory M–I. The percent digital-to-analog converter 456 is set to 0.0% so that the output of the unity gain amplifier 458 is connected to input #2. Switches 444 and 446 are closed. When the voltage is applied to input #1, amplifier 434 produces an output which is applied through the switches 444 and 446 and the diodes 448 and 450 to rapidly charge the capacitor memory M–I. The voltage level on memory M–I is fed back through the amplifier 458 and the percent DAC 456, without division, to input #2 of amplifier 434 until the feedback voltage at input #2 equals the input voltage at input #1. Then the output from the comparator amplifier terminates and the voltage stored on the memory M–I is equal to the voltage at input #1. The procedure for storing a voltage on memory M–II is the same except that switches 435 and 436 are closed rather than switches 444 and 446 and the percent DAC 456 is programed at 100%. The most positive voltage applied to input #1 during a given time period can be stored on capacitor memory M–I by closing only switch 444, or on memory M–II by closing only switch 435 as a result of diodes 448 and 438, respectively. Similarly, the most negative voltage value can be stored on M–I by closing only switch 446 so that the diode 450 is operative, or on M–II by closing only switch 436 so that diode 440 will be operative.

All dynamic measurements are based upon the reference voltage fed back from the percent DAC 456 to input #2 of the comparator 434. This feedback reference voltage is derived from the voltages stored on either or both of the capacitor memories M–I and M–II. For this reason, the automatic operation of the system provides a normalization I period during which a voltage is stored on memory M–I followed by a normalization II period during which a voltage is stored on memory M–II. After normalization of either or both memories M–I and M–II, the voltage on either memory M–I or M–II, or a voltage equal to the voltage on M–I plus a programed percent of the voltage on M–II minus the voltage on M–I may be fed back to input #2 of the comparator amplifier 434 and compared to the voltage at input #1. For example, the voltage on memory M–I can be applied to input #2 by programing the percent DAC to 0.0%. Similarly, the voltage on memory M–II may be applied to input #2 by programing the percent DAC 456 to 100%. When the percent DAC 456 is programed to any percent other than 0.0% or 100%, it acts as a voltage divider so that the feedback reference voltage is equal to the voltage on memory M–I plus the programed percent of the difference between the two voltages. For example, assume +1.0 volt on M–I and +2.0 volts on M–II with 40% programed. The feedback reference voltage would then be +1.4 volts. Whenever the voltage at input #1 of comparator 434 is equal to or less than the voltage at input #2, the output of amplifier 462 is 0.0 volt or a logical "0," and whenever the potential at input #1 exceeds that at input #2, the output of amplifier 462 is +4.0 volts or a logical "1," assuming that switches 435, 436, 444 and 446 are open.

The output from amplifier 462 is applied to a transition detector 464. The transition detector 464 includes a counter which requires that a logic "1" level be present at the output of amplifier 462 for three successive counts of the low speed logic clock. If the output of amplifier 462 should return to "0" level before the count of three, the counter is reset and the count resumed when the output returns to a logic "1" level. The transition detector 464 also has a second counter and logic circuitry which can be programed to indicate either the first or second transition. Positive transitions are indicated by the transition from logic "0" to logic "1." The first and second negative transitions are detected by inverting the logic signal from the amplifier 462 and using the same counters. Then when input #1 of comparator 434 changes from more positive to more negative than input #2, a transition will be detected. The transition signal is fed through conductor 468 to a dynamic sequence timetable structing the data counter control to terminate the data counter control 284 as represented by the line 472 instructing the data counter control to terminate the data count by the counter 286.

The dynamic measurement sequence is automatically controlled by the dynamic sequence timetable 470 and the dynamic sequence interface 474. The low speed logic clock represented by the time line 384 in the timing diagrams of FIGURES 9, 11 and 12 provides, as previously mentioned, the cadence for the dynamic measuring subsystem. On the first low speed clock pulse after the start measurement signal 614 from the delay test timer 255, a dynamic start measurement signal 620 is produced. This signal initiates the rise of a start scan pulse 622a on time line 622 which lasts for one low speed clock pulse. One clock pulse after the dynamic test start signal comes up, major scan I signal 624 comes up and stays up until both major scans have been completed. At the completion of major scan I, a second scan start pulse 622b is generated and lasts for one clock pulse and causes major scan II signal 626 to come up to a logic "1" level. Major scan I signal (MS–I) and major scan II signal (MS–II) are used to gate the appropriate program information out of the various memories at the proper time as will hereafter be described. Major scan I period is indicated by major scan I signal 624 being up and major scan II signal being down, and the major scan II period is indicated by both major scan I and major scan II signals being up. After the ten interlace scans of major scan II, start measurement signal 620 falls to "0" logic level, thereby instigating the test complete signal 616 and the record test results signal 618 in FIGURE 8. One clock pulse later, major scan I signal 624 and major scan II signal 626 return to "0" logic level.

FIGURE 11 illustrates by time lines the sequence of events within a major scan, for example major scan I, when a peak amplitude is not to be stored. At the fall of scan start pulse 622a and the start of major scan I, a normalize memory I signal 632 comes up for three milliseconds plus eight low speed clock pulses. During this period, which may be hereafter referred to as normalization period I, a voltage is stored on capacitor memory M–I which is derived from a source determined by programed information as will presently be described. At the end of normalization period I, a normalize memory II signal comes up for three milliseconds plus eighty low speed clock pulses. During this period a reference voltage is stored on memory M–II. This period is hereafter referred to as normalization period II. Then a normalize sample system signal 636 comes up for three milliseconds plus twenty low speed clock pulses as indicated by pulse 636a to permit the sampling system to normalize on the voltage at T₀.

At the end of the first normalization period 636a for the sampling system, the tens and hundreds decades of the staircase counter, which are used to count the twenty clock pulses, are reset to zero so that interlace scan IS–1 may start on the next low speed clock pulse. At the same time, the count data signal 638 comes up and activates the data counter 286 through the data counter control 284 so that it may also begin on the next count. The count data signal 638 stays up until a transition detection signal is received at the dynamic sequence timetable from the transition detector 464 through conductor 468 at which time the count data signal 638 returns to logic "0" level and the data counter ceases counting. During major scan I the data counter 286 counts in subtract mode, unless otherwise programed. The normalize sampling system signal 636 may come up at the transition detection 638a to start the second normalization period 636b, or may optionally, by manual control, remain down until the staircase counter reaches a count of three hundred ninety-nine in order to complete the entire interlace scan IS–1 for display purposes before starting the normalization period 636b. After the second normalization period 636b, interlace scan IS–2 starts. Normalization periods 636b, 636c, etc., are provided between the ten interlace scans to permit the sampling system to normalize at T₀. During the set of interlace scan periods, either a time or voltage measurement can be made. In either case, the data counter counts in subtract mode and merely continues the count during each interlace scan and the final data count at the end of interlace scan IS–10 represents the first measurement value. After the tenth interlace scan IS–10, scan start pulse 622b occurs and starts major scan II during which the same procedure is repeated, except that the data counter begins, without being reset, to count in the add mode so that the final reading of the data counter provides the differential measurement between the two measurements made during the two major scans.

When the peak amplitude occurring during a particular time interval is to be stored on either memory M–I or memory M–II, the sequence illustrated by the time lines in FIGURE 12 is followed rather than the sequence illustrated in FIGURE 11. The peak storage sequence is the same as the normal storage sequence except that a store peak signal represented by the time line 640 comes up at the end of scan start pulse 622a. Normalize memory I signal 632, normalize memory II signal 634 and normalize sampling system signal 636 occur as previously described except that the first ten interlace scans all proceed to the full three hundred ninety-nine count. However, the data count signal 638 remains at "0" logic level during the first ten interlace scans. A peak store signal 642 complements at the end of each of the first ten interlace scans. The peak store signal 642 is used to effect the storage of one peak, designated peak A, on memory M–I during the odd numbered interlace scans IS–1, 3, 5, 7 and 9, and the storage of a second peak, designated peak B and usually of the opposite polarity, during the even numbered interlace scans IS–2, 4, 6, 8 and 10. After interlace scan IS–10, the ten interlace scans are repeated during which the count data signal 638 is brought up to initiate the data count during each interlace scan is illustrated so as to make the desired amplitude or time measurements based on the voltage or voltages stored in memories M–I and/or M–II.

Although the automatic sequence provides for normalization periods I and II during which a voltage may be stored on memories M–I and M–II, respectively, and also provides, if desired, peak storage periods for storing a peak amplitude on either memory M–I or memory M–II during each of major scans I and II, it will be appreciated that never are more than two of these storage periods utilized, except when a memory is normalized at the opposite high voltage during peak storage, and frequently only one storage period is utilized. For example, assume that it is desired to measure the amplitude of the pulse 314a at $V_{S2}$ with respect to the voltage at $V_{S1}$. For this measurement, the staircase control 362 would be programed, during normalization period I of major scan I, to produce a steady state voltage at the output of the staircase ladder network 358 at a level such as to produce a strobe pulse at time $V_{S1}$ within the fast ramp period $T_0$–$T_{4000}$. The sampling system automatically operates in the sampling mode unless a signal is received on cable 528 from the dynamic sequence interface to ground the probe and input to amplifier 356 by closing switches $L_nR_2$, $L_nR_3$ and 373 and connect the staircase ladder network 358 to the output 431 by opening switches 432 and 433. Nothing would be programed for normalization period II of major scan I. For all voltage measurements, the sampling system is programed to operate in reference mode during the interlace scan periods of both major scans I and II. By reference mode it is meant that the output voltage of the staircase ladder network 358 is applied to input #1 of the comparator amplifier 434. It will be noted that only capacitor memory M–I is being used to store a reference voltage during major scan I.

For major scan II, normalization period I, the staircase control 362 is programmed to operate in the steady state program mode and produce a constant staircase ladder network voltage selected to produce a strobe pulse at time $V_{S1}$, and the sampling system is programed to operate in the sample mode. Nothing is programed for normalization period II for major scan II. The sampling system is again programed to operate in the reference mode, i.e., connect the ladder network 358 to input #1 of the comparator 434.

Then when the system is placed in automatic operation, the system will first take repeated samples of the waveform at $V_{S1}$ during normalization period I of major scan I, and the voltage at $V_{S1}$ will be stored on memory M–I. It is immaterial for an amplitude measurement what voltage is stored on memory M–II because the DAC will subsequently be programed at 0%. During each of the ten interlace scans of major scan I, the staircase control 362 will automatically operate the staircase ladder network in the count mode, and the data counter 286 will automatically be initiated to count, in the subtract mode, the total number of low speed clock pulses occurring during the ten periods defined by the start of each interlace scan and the subsequent transition detection. The total number will be representative of the voltage at $V_{S1}$ with respect to some unknown voltage level.

During normalization period I of major scan II, the sampling system takes repeated samples of the waveform at time $V_{S2}$ and this voltage is again stored on memory M–I. Again the voltage stored on memory M–II is immaterial. The sampling system again operates in referance mode during the interlace scans of major scan II, as will always be the case for amplitude measurements. The data counter 286 again is activated to count the total number of pulses occurring within the count periods of the ten interlace scans of major scan II, but this time the data counter counts in the add mode. The final reading on the data counter is then a direct measure of the difference in the voltage between point $V_{S2}$ and point $V_{S1}$.

It will be appreciated that the amplitude between any two points on the waveform 314 within the time period $T_0$ to $T_{4000}$ can be measured in the same manner by selecting the proper voltage from the staircase ladder network to produce the strobe pulse at the desired time $T_n$ during the normalization period of each major scan. It will also be appreciated that any voltage which can be stored on either memory M–I or M–II can be measured with respect to any other voltage which can be stored on one of the memories. Therefore any point on the waveform can be measured with respect to any reference voltage. In particular, any of the four thousand voltage levels from the staircase ladder network may be stored on either of the memories M–I or M–II by operating the ladder network at the programed level and operating the sampling system in the reference mode during the appropriate normalization period. Of course, the voltage at any lead of the device identifiable by time may be measured with respect to the voltage at any other device lead which is identified by time. Further, either positive or negative peak voltages, $+V_P$ or $-V_P$ on the waveform 314 for example, may be stored and measured during a major scan period. For example, $+V_P$ could be stored, when operating in the peak store mode of FIGURE 12, on memory M–I during interlace scan periods 1, 3, 5, 7 and 9 by closing only switch 444 and operating the staircase ladder network in the count mode and the sampling system in sample mode. Then the peak voltage $+V_P$ would be measured during the second ten interlace scans by standard voltage measurement procedures. This measurement could be programed during either major scan I or major scan II so as to provide a measurement relative to any other voltage stored and measured during the other major scan. The negative peak $-V_P$ could be measured in precisely the same manner except that it would be stored on memory M–I by closing switch 446 during the first ten interlace scans.

Time measurements can be made between amplitude percent levels or voltage levels. In order to obtain percent levels, it is first necessary to define the 0% and 100% levels, which may hereafter be referred to as normalization points, by a time $T_n$ between $T_0$ and $T_{4000}$, or by a known or selected reference level, and then to store these reference values on memories M–I and M–II, respectively, during MS–I and MS–II, respectively. Then the percent DAC is programed to derive the desired percent level to be detected during each major scan. For example, assume that it is desired to measure the rise time of the pulse 314b between a lower percent level $V_X$, such as 15%, and a higher percent level $V_Y$, such as 85%, based upon a 0% value at $V_{S1}$ and a 100% value at $V_{S2}$. The voltage $V_{S1}$ would be stored on memory M–I during normalization period I of major scan I, and $V_{S2}$ would be stored on memory M–II during normalization period II of major scan I. The percent DAC 456 would be programed for 15% during the ten interlace scans of major scan I and the sampling system would be operated in the scan mode during major scan I. The data counter 286 would then count, in subtract mode, the low speed logic clock pulses, and hence the number of samples, from $T_0$ until a transition at $V_X$ for each of the ten interlace scans and thereby sum the total number of samples during the ten scans. During major scan II the voltages $V_{S1}$ and $V_{S2}$ would again be stored on memories M–I and M–II during normalization period I and normalization period II. However, the DAC 456 would be programed for 85% during the ten interlace scans of major scan II. As a result, the data counter 286, counting in add mode, would then count the total samples taken during the ten interlace scans from $T_0$ until a transition at $V_Y$ of each scan. The reading on the data counter would then represent the time required for the pulse 314b to rise from the 15% level to the 85% level. Of course, it will be appreciated that any percent level between two reference voltages stored on memories M–I and M–II can be detected merely by programing the DAC 456, and the time period between any two such detectable percent levels can be measured as described above.

It will be appreciated that other voltage levels on the waveform can be defined as the 0% and 100% normalization points. For example, the negative peak $-V_P$ might be selected as the 0% level and the positive peak $+V_P$ selected as the 100% level. Or the voltage at $V_{S1}$ might be selected as the 0% level and the positive peak $+V_{P1}$ as the 100% level, etc.

Since the transition detector 464 can be programed to detect either the first or second positive transition, or the first or second negative transition, time measurements can be made between any percent level on any transition and any other percent level on any other transition within the count capabilities of the transition detector. Further, since the sampling system may be connected to sample the waveform at any one lead during major scan I and any other waveform during major scan II, time measurements may be made between any identifiable transition point on a waveform occurring at one lead and any identifiable transition point on another waveform occurring at any other lead. For example, if the waveform 314 is an input waveform at one lead, and the waveform 315 is the waveform at a complementary output lead, the delay time between a percent transition point on waveform 314 and the corresponding percent transition point, or any other detectable point, on the waveform 315 can be measured. It is to be understood that the above enumerated measurements are merely exemplary. It will occur to those skilled in the art that many other measurements can be made using the basic capabilities of the system.

The test station memory 524 stores program information for major scan I and major scan II and program information for controlling the D.C. bias supply and static measurement relays $L_nK_n$. This information is gated through a test station interface 526 to the test station relay drivers 150 by the major scan I signal (MS–I) and the major scan II signal (MS–II) from the dynamic sequence timetable. The ground probe signal represented by the control line 528 from the dynamic sequence interface 474 is also fed to the test station interface to open relays $L_nR_1$ and close relays $L_nR_2$ and $L_nR_3$ when the sampling system is being operated in the reference mode.

Memories $M_1$–$M_{10}$ store program information concerning whether the respective D.C. bias supplies #1–#10 are to operate as voltage or current supplies, the magnitude and polarity, and the time at which the respective supplies are to be activated. Pulse generator memories 243 and 244 are programed with information concerning the time of activation, rise time, fall time, amplitude, pulse width, etc. The test start memory 296 is programed with information concerning the time at which the test start signal 608 occurs and the delay period for the delay test timer 255. The measurement, type and range memory 294 is programed with information concerning whether a static or dynamic measurement is to be made, and whether a voltage, current, amplitude or time measurement is to be made, and the range. This program information is fed to the static test control 292 by cable 293, and to the fast ramp generator, the dynamic sequence timetable and the range and type decoder 516 by cable 519. The digital sync memory and interface 311 is programed with information concerning the period of the reset clock, the period of the variable clock, the delay period of the delay clock, and the time position of the sample clock.

Normalization I memory 476 stores program information for controlling the operation of the sampling system during the normalization I periods of both major scan I and major scan II. Normalization II memory 478 stores program information concerning the operation of the sampling system during normalization II periods of both major scan I and major scan II. A percent DAC and transition detector memory 480 has major scan I and major scan II sections. Gate logic circuit 482 gates out either the major scan I information or the major scan II information from the normalization I memory 476 in response to major scan I signal MS–I and major scan II signal MS–II from the dynamic sequence timetable. It will be recalled from FIGURE 9 that when the major scan signal MS–I is up and major scan signal MS–II is down, major scan I period is indicated. Thus during major scan I, the information for normalization period I of major scan I is gated out through cable 483 to the staircase control 362 and through cable 484 to the dynamic sequence timetable 470 and to the dynamic sequence interface 474. Similarly, gate logic circuit 485 alternatively gates out either the normalization II program information for major scan I or major scan II in response to the major scan signal MS–I and major scan signal MS–II received from the dynamic sequence timetable. This information is applied through cable 486 to the staircase control 362 and through cable 487 to the dynamic sequence timetable 470 and to the dynamic sequence interface 474. Since the normalization I and normalization II program information for major scan I is simultaneously gated to the staircase control, the staircase control selectively gates either normalization I program information or normalization II program information to the staircase ladder network in response to the signals 632 and 634 (see FIGURE 11) on lines N–I and N–II, respectively. The same procedure occurs during major scan II. A line designated by the reference character C feeds a signal to the staircase control 362 from the dynamic sequence interface 474 to cause the staircase ladder network to be connected to the staircase counter and operate in the count mode. Lines $C_{20}$ and $C_{80}$ sense when the staircase count reaches the counts of twenty and eighty and this information is used by the dynamic sequence timetable to terminate the normalization periods I and II and the normalization period for the sampling system as previously described and reset the staircase counter by the reset line 475. The dynamic sequence timetable 470 and the dynamic sequence interface 474 also contain gate logic necessary to sequentially employ the normalization I and normalization II program information that is fed simultaneously through the cables 484 and 487 during each of the major scans. In particular, the dynamic sequence interface 474 gates the normalization I and normalization II information to the switches 435, 436, 444 and 446 through the cable 488.

The slope of the fast ramp from the fast ramp generator 322 may be selectively varied during the normalization periods I and II and the scan periods of both major scan I and major scan II. This permits the range to be expanded (i.e., the slope of the ramp decreased to increase the field of view) so that either or both of the voltage memories M–I and M–II may be normalized at a more stable point on the waveform remote from the points to be measured. For example, if a rise time between two percent levels is being measured, the 100% normalization point can be picked at a delayed point on the waveform which is more stable by increasing the field of view, and then, by again decreasing the field of view for the actual measurement, the resolution may be maximized by the narrowed field of view. The range information for the four normalization periods is stored in the normalization I and normalization II memories 476 and 478 and gated out by gate logic circuits 482 and 485 through cable 477 to the measurement type and range memory 294 during the appropriate period. The appropriate period is determined by the logic levels on the control lines MS–I, MS–II, N–I and N–II going to each of the gate logic circuits 482 and 485, as heretofore described. The information is then passed through cable 519 to the ramp generator 322.

Gate logic circuit 490 similarly gates through major scan I or major scan II information in response to the application of the major scan signals MS–I and MS–II. This information is fed through cable 493 to a percent DAC interface 494 which controls the operation of the percent DAC 456. The normalization I and normalization II signals N–I and N–II, respectively, are also applied to the percent DAC interface 494. The normalization I signal automatically switches the percent DAC to 0.0% and the normalization II signal automatically switches the percent DAC to 100%. The absence of either signal switches the percent DAC to the programed percent. Gate logic 490 also gates out the transition detection program information for either major scan I or major scan II and this is applied to the transition detector 464 by control cable 496. Since the transition detector 464 is operative only during the interlace scan period, program information is required only for major scan I and major scan II. However, the program information to the transition detector permits the selective detection of the first or second positive or the first or second negative transitions during either major scan period to permit comparative time measurements between any two of these four transitions.

A data counter memory 500 stores program information regarding the operation of the data counter 286 and this information is fed to the data counter control 284 which in turn controls the data counter 286. The output from the data counter 286 is applied to a pair of digital comparators 502 and 504 which are programed from minimum limit memory 506 and maximum limit memory 507, respectively, to determine whether the data count is less than, greater than or equal to the programed minimum, or less than, greater than or equal to the programed maximum. The output from each of the digital comparators 502 and 504 is applied to a display unit 508 and to a classification unit 509 as represented by the data lines 510 and 512, respectively. The data count from the counter 286 is also applied to a binary-to-decimal decoder 514 which decodes the data count to decimals, and the decimal information is fed to the display unit 508.

In carrying out a series of tests on a particular electronic device, the special socket 22 and socket board 24 are connected to the relay test station 25 by the connectors 30. The code programed on the printed circuit board 24 is fed through the contacts 34 to the control unit 250 for identification purposes to insure that the proper socket is used. The printed circuit performance board 28 is wired so that the proper leads of the test device will be connectable to the necessary D.C. bias supplies #1–#10 and to the proper pulse generator I or II by closing one of the relays $L_n R_n$. Various loads, represented by the resistor 144 in FIGURE 3, may also be connected between the appropriate terminals on the performance board 28 as required.

The drawer 98 is pulled out and the performance board 28 laid in place on the tray 90 and the connectors 120 engaged so that the pulse generators I and II will be connected to the buses $DP_1$ and $DP_2$. The connectors 142 are forced over the edges of the board, the drawer pushed in, and the camming means 96 activated to lift the performance board until the button contacts 86 engage the respective spring contacts 68.

The programing media, such as punched paper, is programed with information indicating the start of test No. 1 and each memory is successively programed. The information for each memory is preceded by the address for the memory. For the first test, all memories must be full because the memories are of the shift register type. A stop signal is placed on the program tape after all of the program information for the first test. Then each successive test is programed in order on the tape followed by a stop signal. Since the memories are shift registers and are randomly addressable through the control unit 250. Only those registers wherein the test criteria are to be changed need to be reprogramed for subsequent tests. The program tape is then inserted in the programing unit 252.

The measuring system may be operated in either the automatic or manual mode. In the manual mode, each test is first programed on a manual signal, then the test performed in response to a manual signal. After the test is performed, operation of the system ceases until the second test program is manually instigated. If desired, however, all tests on the program may be automatically performed once the system is set in operation to program test No. 1. After the final test is completed and the tape reaches the starting point for the first test, operation of the system is automatically terminated. Another device may then be inserted in the socket and the series of tests repeated.

Although portions of the control circuits, such as the dynamic sequence timetable and the dynamic sequence interface, have not been described in detail, the logic function of these various control circuits have been described in sufficient detail to permit one skilled in the art to design a suitable logic circuit. The staircase counter 364 may be substantially identical to the data counter 286, differing in that the reverse count logic is not required and in the manner in which the decades overflow as heretofore described. The staircase ladder network 358 may be of the same configuration as the percent DAC 456, except that a greater number of decades are provided. The staircase control 362 may merely comprise three sets of AND gates, each including a gate for each input of the staircase ladder, which correspond in number to the outputs of the counter 364. Any one of the three sets of gates may be selectively enabled by the lines N–I, N–II or C to effect the operation of the staircase ladder 358 as heretofore described.

From the above description it will be apparent to those familiar with the art that a novel and highly useful measurement system has been described. The system may be used to perform substantially any measurement on substantially any electronic component or circuit. The system is capable of performing a wide variety of static measurements and a wide variety of dynamic measurements, and is fully automatic.

Although a preferred embodiment of the invention has been described in detail, it is to be understood that various changes, substitutions and alterations could be made in the various components and subsystems, and in the arrangement and combination thereof, without departing from the spirit and scope of the invention as defined by the appended claims:

What is claimed is:

1. In a digital synchronization system, the combination of:
   a reference clock generator for producing a high frequency reference clock pulse train,
   first counter means connected to count a programably selectable number of reference clock pulses and then reset,
   second counter means having at least one decade connected to increment one count each time the first counter resets and to reset after a predetermined number of counts,
   programable first clock output means connected to the first counter means and the second counter means for selectively, in the alternative, either gating out a reference clock pulse each time the first counter resets or each time one decade of the second counter resets, and
   programable second clock output means including comparator logic means connected to the first and second counters for detecting when the counters reach the count programed in the second clock output means and gating out a reference clock pulse each time that both the first and second counters reach the programed count.

2. The combination defined in claim 1 further characterized by:
   programable delayed clock output means initiated by the second clock output means for gating out a reference clock pulse a programed number of reference clock pulses after each variable clock pulse.

3. The combination defined in claim 2 further characterized by:
   reset clock output means connected to the second counter means for gating out a reference clock pulse each time the second counter means is reset.

4. The combination defined in claim 3 further characterized by:
   reference clock output means connected to the reference clock generator for gating out each reference clock pulse.

5. The combination defined in claim 1 wherein the first counter is comprised of:
   first and second decade counters, the first decade counter being connected to proceed from a count of nine to a count of zero and the second decade counter being connected to increment one count each time the first decade counter resets from a count of nine to a count of zero.

6. The combination defined in claim 1 wherein the second counter is comprised of:
   third, fourth and fifth decade counters, the third decade counter being connected to proceed from a count of nine to a count of zero, the fourth decade counter being connected to increment one count each time the third counter proceeds from a count of nine to a count of zero and to also proceed from a count of nine to a count of zero, and the fifth decade counter being connected to increment one count each time the fourth decade counter proceeds from a count of nine to a count of zero, and programable logic means for resetting the fifth decade counter to a count of zero when the fifth decade counter reaches a programed count.

7. The combination defined in claim 1 wherein the reference clock generator includes a pulse transformer comprising a pair of transmission cables each having substantially the same characteristic impedance and comprised of a conductor and shield, each conductor and shield having first and second ends, the first ends of the conductors being interconnected to form the input of the transformer, the second ends of each shield being grounded, and the first end of each shield and the second end of each conductor forming the outputs of the transformer whereby when each output is connected to a load having the same characteristic impedance, the input impedance of the transformer and the output impedance of each output will be the same as the characteristic impedance of the transmission cable.

8. The combination defined in claim 7 wherein the transmission cables are coaxial cables.

9. The combination defined in claim 7 wherein the transmission cables are comprised of strip line conductors separated from a shadow plane by a dielectric layer.

10. The combination defined in claim 7 wherein at least one of the outputs is connected to the input of another transformer as defined in claim 7 in which the transmission cables have the same characteristic impedance.

11. The combination defined in claim 7 wherein a portion of the outputs are connected to ground through a resistance value substantially equal to the characteristic impedance of said transmission cables and the remaining outputs are each connected to a transmission cable having substantially the same characteristic impedance.

12. The combination defined in claim 7 wherein at least one of the outputs is coupled to the conductor of a transmission cable by a capacitor, the conductor is biased to a D.C. level, and the transmission cable has substantially the same characteristic impedance as the transmission cables of the transformer and the shield is grounded at both ends.

13. In a digital system, the combination of:
   a plurality of binary stages each having true and complement outputs and a logic "1" state when the true output is at a logic "1" level and a "0" state when the true output is at a logic "0" level, a true input gate which performs a logic AND function and enables the binary to be switched to the logic "1" state on the next clock pulse when satisfied, a complement input gate which performs a logic AND function and enables the binary to be switched to the logic "0" state on the next clock pulse when satisfied, a true clock input for each true input gate, and a complement clock input for each complement input gate,
   first logic gate means connected to apply the pulse of the reference clock pulse train to the true clock inputs when the first logic gate means is enabled,
   means connected to continuously apply the pulses of the reference clock pulse train to the complement clock inputs,
   second logic means interconnecting the outputs and inputs of the binary stages for successively enabling the binary stages to complement from the logic "0" state to the logic "1" state on successive reference clock pulses and for enabling each binary stage to complement back to the logic "0" state on the next clock pulse such that a number is represented by the logic state of the binaries, and
   third logic means for disabling the first logic gate means to cause the binary stages of the counter to reset to the logic "0" state by clock pulse applied to the complement inputs.

14. The combination defined in claim 13 further characterized by:
   an additional binary stage and logic means interconnecting the output of the stages and the input of the additional binary stage for complementing the additional binary stage on the next clock pulse after all of the other binary stages have been successively complemented to a logic "1" state one time.

15. The combination defined in claim 13 wherein:
   there are a total of five binary stages, the first four binary stages being interconnected by the second logic means to successively complement to the logic "1" state on successive clock pulses and to each complement back to the logic "0" state on the next clock pulse after having complemented to the logic "1" state, and the fifth binary stage being interconnected by the second logic means to complement to the logic "1" state on the first clock pulse after all of the first binary stages have successively complemented to the logic "1" state and to complement to the logic "0" state on the first clock pulse after all of the first binary stages have again complemented to a logic "1" state whereby the counter counts in a quibinary mode.

16. The combination defined in claim 15 wherein the second logic means is comprised of:
  logic means for complementing the first binary stage to a logic "1" state only on the first clock pulse after the first four binary stages are in the logic "0" state and for complementing the first binary stage to the logic "0" state on the next clock pulse after the first binary stage is in the logic "1" state,
  logic means for complementing the second binary stage to the logic "1" state only on the first clock pulse after the first binary stage is in the logic "1" state and for complementing the second binary stage back to a logic "0" state on the next clock pulse after the second binary is in the logic "1" state,
  logic means for complementing the third binary stage to a logic "1" state on the first clock pulse after the second binary stage is in the logic "1" state and for complementing the third binary stage back to logic "0" on the first clock pulse after the third binary stage is in the logic "1" state,
  logic means for complementing the fourth binary stage to a logic "1" state on the first clock pulse after the third binary complements to a logic "1" state and for complementing the fourth binary stage back to logic "0" on the first clock pulse after the fourth binary stage is in the logic "1" state, and
  logic means for complementing the fifth binary to the logic "1" state on the first clock pulse after the fourth binary stage is in the logic "1" state and the fifth binary stage is in the logic "0" state, and for complementing the fifth binary stage to the logic "0" state on the first clock pulse after the fourth binary stage is in the logic "1" state and the fifth binary stage is in the logic "1" state.

17. The combination defined in claim 16 further characterized by:
  comparator logic means for comparing the logic level of the outputs of the binary stages with the logic levels of a plurality of program input lines for detecting a preselected count of the counter and producing a logic output when the counter reaches the preselected count,
  a reset binary stage having an input connected to the output of the comparator logic means by logic means for complementing the reset binary stage to a logic "1" state on the first clock pulse after the comparator logic means produce a logic output indicative of the programed count,
  logic means connected to the output of the reset binary stage for disabling the true input gates of the five binary stages and the complement input gate of the fifth binary stage and the second binary stage and for presetting the fifth binary stage to a logic "0" state and the second binary stage to a logic "1" state when the reset binary stage is in the logic "1" state, and
  logic means for complementing the reset binary stage to a logic "0" on the next clock pulse after the reset binary stage is in a logic "1" state.

18. The combination defined in claim 17 wherein the comparator logic means comprises:
  zero and five count gate means having a program input for enabling the gate when a zero or five count is programed and logic input means connected to the outputs of the first four binary stages for producing a logic output from the gate means when the first four binary stages are in the logic "0" state,
  one and six count gate means having a program input for enabling the gate when a one or six count is programed and logic input means connected to an output of the first binary stage for producing a logic output from the gate means when the first binary stage is in the logic "1" state,
  two and seven count gate means having a program input for enabling the gate when a two or seven count is programed and logic input means connected to an output of the second binary stage for producing a logic output from the gate means when the second binary stage is in the logic "1" state,
  three and eight count gate means having a program input for enabling the gate means when a three or eight is programed and logic input means connected to an output of the third binary stage for producing a logic output from the gate means when the third binary stage is in the logic "1" state,
  four and nine count gate means having a program input for enabling the gate when a four or nine count is programed and logic input means connected to an output of the fourth binary stage for producing a logic output from the gate means when the fourth binary stage is in the logic "1" state,
  zero through four count gate means having a program input for enabling the gate means when a count from zero through four is programed and logic input means connected to an output of the fifth binary stage for producing a logic output from the gate means when the fifth binary stage is in a logic "0" state,
  five through nine count gate means having a program input for enabling the gate means when a count from five through nine is programed and logic input means connected to an output of the fifth binary stage for producing a logic output when the fifth binary stage is in the logic "1" state, and
  output gate means connected to the outputs of the count gate means for producing a logic output from the comparator logic means when one of the count gate means connected to the output of the first four binary stages produces a logic output and when one of the count gate means connected to the output of the fifth binary stage produces an output.

19. The combination defined in claim 13 further characterized by:
  comparator logic means for comparing the logic level of the outputs of the binary stages with the logic levels of a plurality of program input lines for detecting a preselected count of the counter and producing a logic output when the counter reaches the preselected count,
  a reset binary stage having an input connected to the output of the comparator logic means by logic means for complementing the reset binary stage to a logic "1" state on the first clock pulse after the comparator logic means produce a logic output indicative of the programed count,
  logic means connected to the output of the reset binary stage for disabling the true input gates of the five binary stages and the complement input gate of the fifth binary stage and the second binary stage and for presetting the fifth binary stage to a logic "0" state and the second binary stage to a logic "1" state when the reset binary stage is in the logic "1" state, and
  logic means for complementing the reset binary stage to a logic "0" on the next clock pulse after the reset binary stage is in a logic "1" state.

20. In a digital system, the combination of:

a reference clock generator for generating a high speed reference clock pulse train, first and second decade counters each comprised of five binary stages, and a data transfer binary stage, each binary stage having true and complement outputs and a logic "1" state when the true output is at a logic "1" level and a logic "0" state when the true output is at a logic "0" level, a true input gate which performs a logic AND function and enables the binary to be switched to the logic "1" state on the next clock pulse when satisfied, a complement input gate which performs a logic AND function and enables the binary to be switched to the logic "0" state on the next clock pulse when satisfied, a true clock input for each true input gate and a complement clock input for each complement input gate, first logic means connected to apply the pulses of the reference clock pulse train to the true clock inputs of the first decade counter and transfer binary stage when the first logic means is enabled.

second logic means connected to apply the pulses of the reference clock pulse train to the true clock inputs of the second decade counter and the complement input of the fifth binary stage when the second logic means is enabled, means connected to continuously apply the pulses of the reference clock pulse train to the complement clock inputs of the first decade counter and the transfer binary stage, third logic gate means connected to apply the pulses of the reference clock pulse train to the complement clock input of the second decade counter when enabled, fourth logic means for each decade counter interconnecting the output and input gates of the respective binary stages in such a manner as to cause the respective decade counters to count in a quibinary mode and reset, fifth logic means interconnecting the outputs of the third and fifth binary stages of the first decade counter and the true input gate of the data transfer stage for enabling the data transfer stage to complement to the logic "1" state on the next clock pulse after the third and fifth binary stages are in the logic "1" state, and for complementing back to the logic "0" state on the next clock pulse, and sixth logic means interconnecting the outputs of the data transfer binary stage and the second and third logic gate means for enabling the second and third logic gate means when the data transfer binary stage is in the logic "1" state and for disabling the second and third logic gate means when the data transfer stage is in the logic "0" state whereby the second decade counter will be supplied a clock pulse to the true and complement clock inputs only on the clock pulse when the first decade counter is reset to a zero count.

21. The combination defined in claim 20 further characterized by:

first and second comparator logic means connected to the outputs of the binary stages of the first and second decade counters, respectively, for producing a logic output signal when the counts of the respective decade counters reach the count programmed in the respective comparator logic means, a reset binary stage, seventh logic means interconnecting the outputs of the first and second comparator logic means and the true input of the reset binary stage for setting the reset binary stage to the logic "1" state on the first clock pulse after both comparator logic means produce an output and for automatically resetting the reset binary stage to a logic "0" state on the next clock pulse thereafter, and eighth logic means interconnecting to the outputs of the reset binary stage and to the first, second and third logic means for disabling the first and second logic means, for enabling the third logic means, for resetting the fifth binary stage of each decade counter to the logic "0" state, for resetting the second binary stage of the first decade counter to the logic "1" state, and for disabling the complement inputs of the second binary stage of the first decade counter whereby the next clock pulse to the true clock inputs and the complement input of the fifth binary stages of the first and second decade counters will be blocked, a clock pulse will be applied to the complement inputs of the binary stages, and the complement input to the second binary stage of the first decade counter will be disabled and the counter preset to a count of two.

22. The combination defined in claim 21 further characterized by:

third, fourth and fifth decade counters each comprised of five binary stages, second and third transfer binary stages, and a second reset binary stage, each binary stage having true and complement outputs and a logic "1" state when the true output is at a logic "1" level and a logic "0" state when the true output is at a logic "0" level, a true input gate which performs a logic AND function and enables the binary to be switched to the logic "1" state on the next clock pulse when satisfied, a complement input gate which performs a logic AND function and enables the binary to be switched to the logic "0" state on the next clock pulse when satisfied, a true clock input for each true input gate and a complement clock input for each complement input gate, logic means for each decade counter interconnecting the output and input gates of the respective binary stages in such a manner as to cause the respective decade counters to count in a quibinary mode and reset, ninth logic means interconnecting the outputs of the first reset binary stage and the true and complement inputs of the binary stages of the second decade counter for gating the next referecence clock pulse to the inputs only after the first reset binary stage is in the logic "1" state, tenth logic means interconnecting the outputs of the first and second comparator logic means and the fourth and fifth binary stages of the third decade counter and the true input to the second transfer binary stage for gating the next reference clock pulse to the second transfer binary stage when the first and second comparator logic means have a logic output and the fourth and fifth binary stages of the third decade counter are in the logic "1" state to complement the second transfer binary stage to a logic "1" state, and for resetting the second transfer stage on the next reference clock pulse, eleventh logic means interconnecting the outputs of the second transfer binary stage and the true and complement inputs of the binary stages of the fourth decade counter for gating the next reference clock pulse to the inputs of the binary stages of the third decade counter after the second transfer binary has switched to a logic "1" state, twelfth logic means connected to the true input of the third transfer binary stage for gating the next reference clock pulse after the first and second comparator logic means produce an output and the fourth and fifth binary stages of the third and fourth decade counters are in a logic "1" state to the true input of the third transfer binary stage, and for resetting the third transfer binary stage to a logic "0" state on the next clock pulse after the stage goes to a logic "1" state, thirteenth logic means interconnecting the outputs of the third transfer binary stage and the true and complement inputs of the fifth decade counter for gating the next clock pulse after the third transfer binary stage is in the logic "1" state to the fifth decade counter, third programable comparator logic means connected to the outputs of the binary stages of the fifth decade counter for producing a logic output when the fifth decade counter reaches a programmed count, and fourteenth logic means connected to apply the next clock pulse to the true input of the second reset binary stage after the first, second and third comparator logic means produce a logic output and the fourth and fifth binary stages of the third and fourth decade counters are in the logic "1" state.

23. The combination defined in claim 22 further characterized by:

reset clock output means comprised of logic gate means connected to the output of the second reset binary stage for gating out the next reference clock pulse after the second reset binary stage is in the logic "1" state.

24. The combination defined in claim 22 further characterized by:

variable clock output means comprised of programable logic gate means connected to the outputs of the first reset binary stage, the second and third transfer binary stages, and the second reset binary stage for selectively, by program lines, gating out the next reference clock pulse after the selected binary stage is in the logic "1" state.

25. The combination defined in claim 22 further characterized by:

fourth, fifth, sixth, seventh and eighth programable comparator logic means connected to the outputs of the binary stages of the first, second, third, fourth and fifth decade counters, respectively, each comparator logic means producing a logic output when the corresponding decade counter reaches the count programmed for the comparator logic means, and sample clock output means connected to the outputs of the fourth, fifth, sixth, seventh and eighth comparator logic means for gating out a reference clock pulse at a selected time after said five comparator logic means produce a logic output.

26. The combination defined in claim 25 wherein:

the sample clock output means includes a delay binary stage which delays the output of the sample clock output means by one reference clock pulse whereby the second reference clock pulse after said five comparator logic means produce a logic output will be gated out.

27. The combination defined in claim 26 further characterized by:

programable logic means connected to selectively disable the complement input of the first reset binary stage so that the third decade counter will count every reference clock pulse, and connected to bypass the delay binary stage whereby the sample clock output means will gate out the first reference clock pulse after said five comparator logic means all produce a logic output.

28. The combination defined in claim 22 further characterized by:

programable logic means for disabling the true clock inputs of the binary stages of the fifth decade counter when the third comparator logic means is programmed to a count of one whereby the fifth decade counter will be bypassed.

29. The combination defined in claim 24 further characterized by:

delayed clock output means connected to the variable clock output means for producing gating out a reference clock pulse a predetermined number of reference clock pulses after the pulse is gated out from the variable clock output means.

30. The combination defined in claim 29 wherein the delayed clock output means is comprised of:

sixth and seventh decade counters, each comprised of five binary stages, a fourth transfer binary stage and a third reset binary stage, each binary stage having true and complement outputs and a logic "1" state when the true output is at a logic "1" level and a logic "0" state when the true output is at a logic "0" level, a true input gate which performs a logic AND function and enables the binary to be switched to the logic "1" state on the next clock pulse when satisfied, a complement input gate which performs a logic AND function and enables the binary to be switched to the logic "0" state on the next clock pulse when satisfied, a true clock input for each true input gate and a complement clock input for each complement input gate, fifteenth logic means connected to apply reference clock pulses to the true and complement inputs of the sixth decade counter and the fourth transfer binary stage when enabled, sixteenth logic means connected to apply reference clock pulses to the complement inputs of the sixth decade counter and the fourth transfer decade when enabled, seventeenth logic means connected to apply reference clock pulses to the true and complement inputs of the seventh decade counter, eighteenth logic means interconnecting the outputs of the third and fifth binary stages of the sixth decade counter and the true input of the fourth transfer binary stage for switching the fourth binary stage to a logic "1" state on the first reference clock pulse thereto after said third and fifth binary stages are in the logic "1" state, nineteenth logic means interconnecting the output of the fourth transfer binary stage and the seventeenth logic means for enabling the seventeenth logic means when the fourth transfer binary stage is in the logic "1" state, twentieth logic means connected to apply a reference clock pulse to the true input of the third reset binary stage when enabled, the twentieth logic means being disabled when the third reset binary stage is in the logic "1" state, ninth and tenth programable comparator logic means interconnecting the outputs of the binary stages of the sixth and seventh decade counters, respectively, and the true input of the third reset binary stage for switching the third reset binary stage to the logic "1" state on the first reference clock pulse applied to the true input after the counts in the sixth and seventh decade counters reach the count programed in the respective comparator logic means, twenty-first logic means interconnecting the output of the third reset binary stage and the fifteenth and seventeenth logic means for disabling the fifteenth and seventeenth logic means when the third reset binary stage is in the logic "1" state, twenty-second logic means connected to apply reference clock pulses to the complement inputs of the seventh decade counter when the third reset binary stage is in the logic "1" state, twenty-third logic means connected to apply a reference clock pulse to the complement input of the third reset binary stage when enabled, the twenty-third logic means being disabled when the third reset binary stage is in the logic "0" state, twenty-fourth programable logic means for selectively enabling the fifteenth, sixteenth, seventeenth and twenty-third logic means when one of the reset binary stages or transfer binary stages is in the logic "1" state, logic means interconnecting the variable clock output logic means and the complement input of the third reset binary stage for enabling the third reset binary stage during the variable clock pulse output, and output logic means connected to the outputs of the ninth and tenth comparator logic means and the third reset binary stage for gating out the first reference clock pulse after the ninth and tenth comparator logic means produce a logic output and the third reset binary stage is in the logic "0" state.

31. A programable digital comparator for detecting the count of a quibinary counter comprising:

zero and five count gate means having a program input for enabling the gate when a zero or five count is programed and logic input means connected to the outputs of the first four binary stages for producing a logic output from the gate means when the first four binary stages are in the logic "0" state, one and six count gate means having a program input for enabling the gate when a one or six count is programed and logic input means connected to an output of the first binary stage for producing a logic output from the gate means when the first binary stage is in the logic "1" state, two and seven count gate means having a program input for enabling the gate when a two or seven count is programed and logic input means connected to an output of the second binary stage for producing a logic output from the gate means when the second binary stage is in the logic "1" state, three and eight count gate means having a program input for enabling the gate means when a three or eight is programed and logic input means connected to an output of the third binary stage for producing a logic output from the gate means when the third binary stage is in the logic "1" state, four and nine count gate means having a program input for enabling the gate when a four or nine count is programed and logic input means connected to an output of the fourth binary stage for producing a logic output from the gate means when the fourth binary stage is in the logic "1" state, zero through four count gate means having a program input for enabling the gate means when a count from zero through four is programed and logic input means connected to an output of the fifth binary stage for producing a logic output from the gate means when the fifth binary stage is in a logic "0" state, five through nine count gate means having a program input for enabling the gate means when a count from five through nine is programed and logic input means connected to an output of the fifth binary stage for producing a logic output when the fifth binary stage is in the logic "1" state, and output gate means connected to the outputs of the count gate means for producing a logic output from the comparator logic means when one of the count gate means connected to the output of the first four binary stages produces a logic output and when one of the count gate means connected to the output of the fifth binary stage produces an output.

32. In a system for counting the pulses of a high speed reference pulse train, the combination of:

resettable counter means comprised of a plurality of binary stages each clocked by the reference pulses for counting the pulses of the reference clock pulse train, logic means connected to the counter means for producing a logic output after the counter means has reached a predetermined count, and binary means clocked by the reference clock source and connected to the logic means, the binary means being adapted to change from a first state to a second state on the first reference clock pulse after the logic means produces said logic output and to change back to the first state on the second reference clock pulse, the output of the binary means being connected to enable the reset of the counter means when in the second state such that the counter means will be reset on said second reference clock pulse to a count of two.

33. The combination defined in claim 32 wherein the logic means comprises programable logic means for producing said logic output when the counter means reaches a programed count.

34. In a digital system, the combination of:

first counter means connectable to the clock source for counting a predetermined maximum number of the clock pulses of the clock pulse train and then resetting from the maximum count to a minimum count, second counter means connectable to the clock source for counting the clock pulses of the clock pulse train when enabled, first logic means connected to the first counter for producing a logic output when the first counter has reached the maximum count less one count, binary means connectable to the clock source and adapted to change states on the first clock pulse of the clock pulse train after being enabled, the binary means being connected to the output of the logic means and being enabled by said logic output so as to change from a first state to a second state on the same clock pulse that the counter reaches the maximum count, and second logic means connected to the output of the binary means and to the second counter means for enabling the counter means when the binary means is in the second state whereby the counter means will increment one count on the same clock pulse that the first counter means is reset to the maximum count.

35. The combination defined in claim 34 wherein:

the second counter means resets to a minimum count after reaching a predetermined maximum count, and further characterized by third counter means connectable to the clock source for counting the clock pulses of the clock pulse train when enabled, third logic means connected to the second counter means for producing a logic output when the second counter means reaches the maximum count, second binary means connectable to the clock source and adapted to change from a first state to a second on the first clock pulse after being enabled, the second binary means being connected to the first and third logic means and being enabled when both the first and third logic means produce said logic output, and fourth logic means connecting the output of the second binary means to the third counter means for enabling the third counter means when the second binary means is in the second state whereby the third counter means will increment on the same clock pulse that the first and second counter means reset to the respective minimum count.

36. In a synchronous digital system, the combination of:

a reference clock source for producing a clock pulse train, first counter means comprised of a plurality of binary stages each clocked by the pulses of the clock pulse train for counting a programably selectable number of reference clock pulses and then resetting, second counter means comprised of a plurality of binary stages each clocked by the pulses of the clock pulse train for counting a predetermined number of clock pulses and then resetting, first logic means for producing a first logic signal when the first counter has reached the programably selectable number, and second logic means for gating the next reference clock pulse after the occurrence of said first logic signal to the second counter.

37. The combination defined in claim 36 wherein:
the second counter means is comprised of at least two decades, the first decade having a fixed reset count and the last decade having a programably selectable reset count.

38. A pulse transformer comprising the combination of:

a pair of transmission cables each having substantially the same characteristic impedance and comprised of a conductor and shield, each conductor and shield having first and second ends, the first ends of the conductors being interconnected to form the input of the transformer, the second end of each shield being grounded, and the first end of each shield and the second end of each conductor forming the outputs of the transformer whereby when each output is connected to a load having an input impedance substantially matching the characteristic impedance of the transmission cables, the input impedance of the transformer and the output impedance of each output will be the same as the characteristic impedance of the transmission cable.

39. The transformer defined in claim 38 wherein the transmission cables are coaxial cables.

40. The transformer defined in claim 38 wherein the transmission cables are each comprised of a strip line conductor and a shadow plane separated by a dielectric layer.

41. The transformer defined in claim 38 wherein each of the pair of transmission cables has a time length greater than about one-half the pulse width to be transformed.

42. The transformer defined in claim 38 wherein each of the pair of transmission cables has a ferrite core.

43. In a synchronous digital system, the combination of:

a clock source for producing short reference pulses at a high repetition rate, a counter for counting a predetermined number of the reference pulses and then resetting having a plurality of synchronous binary stages each clocked by the reference pulses, first logic means for detecting a preselected count of the counter and producing a logic signal after the counter has reached the preselected count, and logic gate means for gating out a predetermined reference pulse after the first logic means has produced the logic signal.

44. The combination defined in claim 43 further characterized by:

a second counter for counting a predetermined number of reference pulses and automatically resetting having a plurality of binary stages each clocked by the reference pulses gated out by the logic gate means to cause the second counter to count.

References Cited

UNITED STATES PATENTS

| | | | |
|---|---|---|---|
| 3,237,171 | 2/1966 | Young | 340—172.5 |
| 3,158,839 | 11/1964 | Anderson | 340—172.5 |
| 3,156,899 | 11/1964 | Reich et al. | 340—172.5 |
| 3,153,776 | 10/1964 | Schwartz | 340—172.5 |
| 3,112,394 | 11/1963 | Close et al. | 235—61.9 |
| 3,071,739 | 1/1963 | Runyon | 333—18 |
| 3,037,194 | 5/1962 | Dirks | 340—172.5 |
| 2,974,866 | 3/1961 | Haddad et al. | 235—157 |
| 2,840,798 | 6/1958 | Cooper et al. | 340—174 |
| 2,740,106 | 3/1956 | Phelps | 340—147 |
| 3,366,886 | 1/1968 | Dryden et al. | 328—233 |
| 3,359,406 | 12/1967 | Perry | 235—92 |
| 3,348,029 | 10/1967 | Krokar | 235—92 |
| 3,226,562 | 12/1965 | Neitzert | 307—88 |
| 2,999,207 | 9/1961 | Quynn | 328—44 |
| 2,997,234 | 8/1961 | Hughes | 235—160 |

GARETH D. SHAW, *Primary Examiner.*